United States Patent
Bodas et al.

(10) Patent No.: US 9,921,633 B2
(45) Date of Patent: Mar. 20, 2018

(54) POWER AWARE JOB SCHEDULER AND MANAGER FOR A DATA PROCESSING SYSTEM

(71) Applicant: Intel Corporation, Santa Clara, CA (US)

(72) Inventors: Devadatta V. (Deva) Bodas, Federal Way, WA (US); Justin J. Song, Olympia, WA (US); Muralidhar (Murali) Rajappa, Chandler, AZ (US); Andy Hoffman, Olympia, WA (US); James W. (Jimbo) Alexander, Hillsboro, OR (US); Joseph A. Schaefer, Beaverton, OR (US); Sunil K. Mahawar, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 74 days.

(21) Appl. No.: 14/582,764

(22) Filed: Dec. 24, 2014

(65) Prior Publication Data
US 2016/0054780 A1 Feb. 25, 2016

Related U.S. Application Data

(60) Provisional application No. 62/040,576, filed on Aug. 22, 2014.

(51) Int. Cl.
*G06F 1/32* (2006.01)
*H04L 12/24* (2006.01)
(Continued)

(52) U.S. Cl.
CPC .......... *G06F 1/3203* (2013.01); *G05B 15/02* (2013.01); *G06F 1/30* (2013.01); *G06F 1/329* (2013.01);
(Continued)

(58) Field of Classification Search
CPC ....... G06F 1/329; G06F 9/4893; G06F 9/5094
(Continued)

(56) References Cited

U.S. PATENT DOCUMENTS

| 5,388,265 A | 2/1995 | Volk |
| 5,598,537 A | 1/1997 | Swanstrom et al. |

(Continued)

FOREIGN PATENT DOCUMENTS

| WO | WO-2002/019078 | 3/2002 |
| WO | WO-2004/070619 | 8/2004 |

(Continued)

OTHER PUBLICATIONS

Alvarruiz, F., de Alfonso, C., Caballer, M. and Hernández, V. 2012. An Energy Manager for High Performance Computer Clusters. ISPA '12 Proceedings of the 2012 IEEE 10th International Symposium on Parallel and Distributed Processing with Applications, pp. 231-238.

(Continued)

*Primary Examiner* — Vincent Tran
(74) *Attorney, Agent, or Firm* — Womble Bond Dickinson (US) LLP

(57) ABSTRACT

An indication of a mode for a job is received. An available power for the job is determined based on the mode. A first power for the job is allocated based on the available power. A first frequency for the job is determined based on the available power. The first power is adjusted based on the available power.

21 Claims, 25 Drawing Sheets

(51) Int. Cl.
  *G05B 15/02* (2006.01)
  *G06F 1/30* (2006.01)
  *G06Q 50/06* (2012.01)
  *G06F 9/48* (2006.01)
  *H04L 12/911* (2013.01)
  *G06F 9/50* (2006.01)

(52) U.S. Cl.
  CPC .......... *G06F 1/3209* (2013.01); *G06F 1/3228* (2013.01); *G06F 1/3234* (2013.01); *G06F 1/3296* (2013.01); *G06F 9/4881* (2013.01); *G06F 9/4893* (2013.01); *G06F 9/5094* (2013.01); *G06Q 50/06* (2013.01); *H04L 41/0833* (2013.01); *H04L 47/783* (2013.01); *H04L 47/821* (2013.01); *Y02B 60/142* (2013.01)

(58) Field of Classification Search
  USPC ........................................ 713/300, 320, 340
  See application file for complete search history.

(56) References Cited

U.S. PATENT DOCUMENTS

| | | |
|---|---|---|
| 5,752,050 A | 5/1998 | Hernandez et al. |
| 5,784,628 A | 7/1998 | Reneris |
| 5,842,027 A | 11/1998 | Oprescu et al. |
| 5,905,900 A | 5/1999 | Combs et al. |
| 6,125,450 A | 9/2000 | Kardach |
| 6,745,335 B1 | 6/2004 | Kusano |
| 6,760,852 B1 | 7/2004 | Gulick |
| 6,971,033 B2 | 11/2005 | Ma |
| 7,028,200 B2 | 4/2006 | Ma |
| 7,111,179 B1 | 9/2006 | Girson et al. |
| 7,143,300 B2 | 11/2006 | Potter et al. |
| 7,861,068 B2 | 12/2010 | Gorbatov et al. |
| 8,001,403 B2 | 8/2011 | Hamilton et al. |
| 8,060,762 B2 | 11/2011 | Banginwar et al. |
| 8,336,056 B1 | 12/2012 | Gadir |
| 2002/0194251 A1 | 12/2002 | Richter et al. |
| 2003/0041272 A1 | 2/2003 | Nguyen |
| 2003/0126240 A1 | 7/2003 | Vosseler |
| 2003/0163745 A1 | 8/2003 | Kardach |
| 2003/0221026 A1 | 11/2003 | Newman |
| 2004/0022225 A1 | 2/2004 | Liang et al. |
| 2004/0025063 A1 | 2/2004 | Riley |
| 2005/0113103 A1 | 5/2005 | Snowden et al. |
| 2005/0136961 A1 | 6/2005 | Simonsson et al. |
| 2005/0138438 A1 | 6/2005 | Bodas |
| 2005/0273633 A1 | 12/2005 | Wilcox et al. |
| 2007/0240160 A1 | 10/2007 | Paterson-Jones |
| 2007/0245161 A1* | 10/2007 | Shaw .................. G06F 1/3203 713/300 |
| 2008/0104428 A1* | 5/2008 | Naffziger .............. G06F 1/3203 713/300 |
| 2008/0178019 A1 | 7/2008 | McGrane et al. |
| 2008/0209243 A1* | 8/2008 | Ghiasi .................. G06F 1/3203 713/320 |
| 2008/0222434 A1 | 9/2008 | Shimizu et al. |
| 2008/0301475 A1* | 12/2008 | Felter .................... G06F 1/3203 713/300 |
| 2009/0049313 A1 | 2/2009 | Gooding et al. |
| 2009/0083746 A1 | 3/2009 | Katsumata et al. |
| 2009/0113221 A1* | 4/2009 | Holle ...................... G06F 1/189 713/310 |
| 2009/0138219 A1 | 5/2009 | Bletsch et al. |
| 2009/0254660 A1 | 10/2009 | Hanson et al. |
| 2009/0265568 A1 | 10/2009 | Jackson |
| 2009/0271046 A1 | 10/2009 | Lewis et al. |
| 2010/0106985 A1 | 4/2010 | Panguluri |
| 2010/0205469 A1* | 8/2010 | McCarthy ............. G06F 9/5061 713/324 |
| 2010/0235840 A1* | 9/2010 | Angaluri ................ G06F 1/329 718/102 |
| 2010/0257531 A1 | 10/2010 | Barsness et al. |
| 2010/0313203 A1 | 12/2010 | Dawson et al. |
| 2011/0022857 A1 | 1/2011 | Nussbaum |
| 2011/0022868 A1 | 1/2011 | Harchol-Balter et al. |
| 2011/0161696 A1 | 6/2011 | Fletcher |
| 2011/0167425 A1 | 7/2011 | Lurie et al. |
| 2011/0178652 A1* | 7/2011 | Carter ................... G06F 1/3203 700/296 |
| 2011/0271283 A1 | 11/2011 | Bell, Jr. et al. |
| 2012/0005683 A1* | 1/2012 | Bower, III ............ G06F 9/5094 718/103 |
| 2012/0054512 A1 | 3/2012 | Archibald et al. |
| 2012/0060170 A1* | 3/2012 | Vajda .................... G06F 9/4893 718/104 |
| 2012/0072745 A1 | 3/2012 | Ahluwalla |
| 2012/0084580 A1* | 4/2012 | Harchol-Balter ..... G06F 1/3203 713/310 |
| 2012/0165963 A1 | 6/2012 | Kim et al. |
| 2012/0216205 A1* | 8/2012 | Bell, Jr. ................ G06F 9/5094 718/102 |
| 2012/0324264 A1 | 12/2012 | Hanson et al. |
| 2013/0103968 A1* | 4/2013 | Conroy ..................... G06F 1/26 713/340 |
| 2013/0124885 A1 | 5/2013 | Davis et al. |
| 2013/0139172 A1 | 5/2013 | An et al. |
| 2013/0185576 A1* | 7/2013 | Brundridge ............... G06F 1/32 713/320 |
| 2013/0212410 A1 | 8/2013 | Li et al. |
| 2013/0227557 A1 | 8/2013 | Pechanec et al. |
| 2013/0339776 A1 | 12/2013 | Jagadishprasad |
| 2014/0086534 A1 | 1/2014 | Jain et al. |
| 2014/0059556 A1 | 2/2014 | Barness et al. |
| 2014/0075222 A1* | 3/2014 | Jackson .................... G06F 1/329 713/320 |
| 2014/0075448 A1 | 3/2014 | Bell, Jr. et al. |
| 2014/0114107 A1 | 4/2014 | Gami |
| 2014/0137121 A1 | 5/2014 | Asakura et al. |
| 2014/0149768 A1* | 5/2014 | Kansal .................. G06F 1/3203 713/320 |
| 2014/0214107 A1* | 7/2014 | Gandhi ................ A61N 1/3708 607/8 |
| 2014/0245054 A1* | 8/2014 | Hamdi ................. G06F 11/3062 713/340 |
| 2014/0282425 A1 | 9/2014 | Zhao et al. |
| 2014/0317635 A1 | 10/2014 | Konno et al. |
| 2015/0067693 A1* | 3/2015 | Yamazaki ............. G06F 9/4893 718/103 |
| 2015/0169026 A1* | 6/2015 | Bodas .................... G06F 1/3206 713/320 |
| 2015/0177814 A1 | 6/2015 | Bailey |
| 2015/0248312 A1* | 9/2015 | Brochard .............. G06F 9/4893 718/103 |
| 2016/0011914 A1* | 1/2016 | Bohn .................... G06F 9/5094 713/300 |

FOREIGN PATENT DOCUMENTS

| | | |
|---|---|---|
| WO | WO-2006/007146 | 1/2006 |
| WO | WO-2013/172816 | 11/2013 |
| WO | WO 2014-053610 A1 | 4/2014 |

OTHER PUBLICATIONS

Bhattacharya, A. *Constraints and Techniques for Software Power Management in Production Clusters*. Technical Report No. UCB/EECS-2013-110, Electrical Engineering and Computer Sciences, University of California at Berkeley, May 17, 2013, total 72 pages. http://www.eecs.berkeley.edu/Pubs/TechRpts/2013/EECS-2013-110.pdf.

Brehm, M. 2013. *Energy Aware Scheduling SuperMUC@ LRZ*. Application Support Group. Leibniz Supercomputing Centre, total 7 pages. http://www.autotune-project.eu/system/files/Matthias_Brehm_Energietag.pdf.

Cai, C., Wang, L., Khan, S. and Tao, J., 2011. Energy-aware High Performance Computing—A Taxonomy Study. Parallel and Distrib-

(56) References Cited

OTHER PUBLICATIONS uted Systems (ICPADS), 2011 IEEE 17th International Conference on. (Tainan, Taiwan. Dec. 7, 2009), pp. 953-958.
Department of Energy. 2013. CORAL procurement benchmarks. LLNL-PRE-637694. (May 31, 2013), total 15 pages. https://asc.llnl.gov/CORAL-benchmarks/CORALBenchmarksProcedure-v26.pdf.
Etinski, M., Corbalan, J. and Labarta, J. *Power-Aware Parallel Job Scheduling*. Barcelona Supercomputing Center, total 2 pages, downloaded from internet on Jan. 6, 2015. http://nsfcac.rutgers.edu/GreenHPC/EEHiPC/eehipc_etinski.pdf.
HP, Intel, Microsoft, Phoenix, Toshiba, Dec. 6, 2011. *Advanced Configuration and Power Interface Specification Revision 5.0.*, total 958 pages. http://www.acpi.info/DOWNLOADS/ACPIspec50.pdf.
Lefurgy, C., Allen-Ware, M., Carter, J., El-Essawy, W., Felter, W., Ferreira, A., Huang, W., Hylick, A., Keller, T., Rajamani, K., Rawson F. and Rubio, J. 2011. Energy-Efficient Data Centers and Systems. 2011 IEEE International Symposium on Workload Characterization. (Austin, Texas. Nov. 6, 2011), total 214 pages. http://researcher.watson.ibm.com/researcher/files/us-lefurgy/EEDCS_tutorial_IISWC2011.pdf.
Mämmelä, O., Majanen, M., Basmadjian, R., De Meer, H., Giesler, A. and Homberg, W. Energy-aware job scheduler for high-performance computing. Computer Science—Research and Development 27, No. 4 (2012): 265-275, published online Aug. 31, 2011.
Matthieu, H. Power capping in SLURM. Green days @ life, (Nov. 2013), total 27 pages.
Rountree, B., Ahn, D., de Supinski, B., Lowenthal, D. and Schulz, M. 2012. Beyond DVFS: A First Look at Performance Under a Hardware-Enforced Power Bound. *8th Workshop on High-Performance, Power-Aware Computing (HPPAC)*. (May 21, 2012), total 9 pages. https://e-reports-ext.llnl.gov/pdf/576372.pdf.
2013. *Slurm Workload Manager*. (Nov. 2013), total 2 pages. http://slurm.schedmd.com.
Yoo, A., Jette, M. and Grondona, M. 2003. SLURM: Simple Linux utility for resource management. In, Feitelson, D., Rudolph, L. and Schwiegelshohn, U. editors. Job Scheduling Strategies for Parallel Processing. 9th Springer Verlag International Workshop. JSSPP 2003 (Seattle Jun. 2003). Lect. Notes Comput. Sci. vol. 2862, pp. 44-60.
Zhou, Z., Lan, Z., Tang, W. and Desai, N. 2013. Reducing Energy Costs for IBM Blue Gene/P via Power-Aware Job Scheduling. Department of Computer Science, Illinois Institute of Technology; Mathematics and Computer Science Division, Argonne National. Laboratory. JSSPP 2013, total 20 pages. http://www.cs.huji.ac.il/~feit/parsched/jsspp13/zhou.pdf.
International Search Report for International Appln. No. PCT/US2015/036294, dated Sep. 25, 2015, 12 pgs.
Alvarruiz, F., de Alfonso, C., Caballer, M. and Hernández, V. 2012. *An Energy Manager for High Performance Computer Clusters. ISPA '12 Proceedings of the 2012 IEEE 10th International Symposium on Parallel and Distributed Processing with Applications.*
Bhattacharya, A. 2013. *Constraints and Techniques for Software Power Management in Production Clusters. Technical Report No. UCB/EECS-2013-110, Electrical Engineering and Computer Sciences, University of California at* Berkeley. http://www.eecs.berkeley.ed.
Brehm, M. 2013. *Energy Aware Scheduling SuperMUC@ LRZ. Application Support Group. Leibniz Supercomputing Centre.* http://www.autotune-project.eu/system/files/Matthias_Brehm_Energietag.pdf.
Cai, C., Wand, L., Khan, S. and Tao, J. 2011. *Energy-aware High Performance Computing—A Taxonomy Study. Parallel and Distributed Systems (ICPADS), 2011 IEEE 17th International Conference on.* (Tainan, Taiwan. Dec. 7, 2009.
*Department of Energy. 2013. CORAL procurement benchmarks. LLNL-PRE-637694.* (May 31, 2013). https://asc.llnl.gov/CORAL-benchmarks/CORALBenchmarksProcedure-v26.Pdf.

Etinski, M., Corbalan, J. and Labarta, J. *Power-Aware Parallel Job Scheduling. Barcelona Supercomputing Center.* http://nsfcac.rutders.edu/GreenHPC/EEHiPC/eehipc_etinski.pdf.
*HP, Intel, Microsoft,* Phoenix, *Toshiba.* 2011. *Advanced Configuration and Power Interface Specification Revision 5.0.* http://www.acpi.info/DOWNLOADS/ACPIspec50.pdf.
*Intel® Corp. 2014. Intel® 64 and IA-32 Architectures Software Developer Manuals.* vol. 2 (2A, 2B, & 2C), total 1,495 pages. http://www.intel.com/content/www/us/en/processors/architectures-software-developer-manuals.html.
Lefurgy, C., Allen-Ware, M., Carter, J., El-Essawy, W., Felter, W., Ferreira, A., Huang, W., Hylick, A., Keller, T., Rajamani, K., Rawson F. and Rubio, J. 2011. *Energy-Efficient Data Centers and Systems. 2011 IEEE International Symposium on Workload Charac.*
Mämmelä, O., Majanen, M., Basmadjian, R., De Meer, H., Giesler, A. and Homberg, W. *Energy-aware job scheduler for high-performance computing. Computer Science—Research and Development 27*, No. 4 (2012): 265-275.
Matthieu, H. *Power capping in SLURM. Green days @ life,* (Nov. 2013).
Rountree, B., Ahn, D., de Supinski, B., Lowenthal, D. and Schulz, M. 2012. *Beyond DVFS: A First Look at Performance Under a Hardware-Enforced Power Bound. 8th Workshop on High-Performance, Power-Aware Computing (HPPAC).* (May 2012). https://e-reports-ext.II.
2013. *Slurm Workload Manager.* (Nov. 2013). http://slurm.schedmd.com.
Yoo, A., Jette, M. and Grondona, M. 2003. *SLURM: Simple Linux utility for resource management.* In, Feitelson, D., Rudolph, L. and Schwiegelshohn, U. editors. *Job Scheduling Strategies for Parallel Processing. 9th Springer Verlag International Workshop. JS.*
Zhou, Z., Lan, Z., Tang, W. and Desai, N. 2013. *Reducing Energy Costs for IBM Blue Gene/P via Power-Aware Job Scheduling. Department of Computer Science, Illinois Institute of Technology: Mathematics and Computer Science Division, Argonne National Laboratory.*
PCT Notification of Transmittal of the International Search Report and the Written Opinion of the International Searching Authority or the Declaration for PCT Counterpart Application No. PCT/US2012/037812, 10 pgs., (dated Jan. 23, 2013).
PCT Notification concerning Transmittal of International Preliminary Report on Patentability (Chapter I of the Patent Cooperation Treaty) for PCT Counterpart Application No. PCT/US2012/037812, 7 pgs., (dated Nov. 27, 2014).
PCT Written Opinion of the International Searching Authority for PCT Counterpart Application No. PCT/US2012/038405 5 pgs., (dated Feb. 28, 2013).
PCT International Search Report and Written Opinion received for PCT Patent Application No. PCT/US2012/038405, dated May 17, 2012, 3 pages.
PCT Notification concerning Transmittal of International Preliminary Report on Patentability (Chapter I of the Patent Cooperation Treaty) for PCT Counterpart Application No. PCT/US2012/038405, 7 pgs., (dated Nov. 27, 2014).
PCT International Search Report and Written Opinion received for PCT Patent Application No. PCT/US2012/036403, dated Sep. 4, 2015, 14 pages.
First Office Action (and English translation) from CN Application No. 200410101227.1, dated Dec. 1, 2006, 27 pgs.
Abstract from W00219078, corresponding to reference CN 1449517A cited in CN OA above, 7 pgs.
Office Action from UK Patent Application No. 0425264.9, dated Sep. 22, 2006, 6 pgs.
Office Action from UK Patent Application No. 0609876.8, dated Sep. 22, 2006, 5 pgs.
PCT Notification of Transmittal of the International Search Report and the Written Opinion of the International Searching Authority or the Declaration for PCT Counterpart Application No. PCT/US2012/036435, 16 pgs., (dated Sep. 18, 2015).
Deva Bodas, et al, "Simple Power-Aware Scheduler to Limit Power Consumption by HPC System within a Budget," Intel Corporation (U.S. Appl. No. 62/040, 576). 10 pages.
"Activity Monitor Demystified", Skvorc, 2012, 21 pages.

(56) References Cited

OTHER PUBLICATIONS

International Preliminary Report on Patentability for International Appln. No. PCT/US2015/036403, dated Mar. 9, 2017, 9 pgs.
International Preliminary Report on Patentability for International Appln. No. PCT/US2015/036435, dated Mar. 9, 2017, 12 pgs.
International Preliminary Report on Patentability for International Appln. No. PCT/US2015/036294, dated Mar. 9, 2017, 9 pgs.
Zhai et al., HaPPy: Hyperthread-aware Power Profiling Dynamically, 2014 USENIX Annual Technical Conference, Jun. 2014.
Silberschatz et al., Operating System Concepts, 2013, John Wiley & Sons, Inc.

* cited by examiner

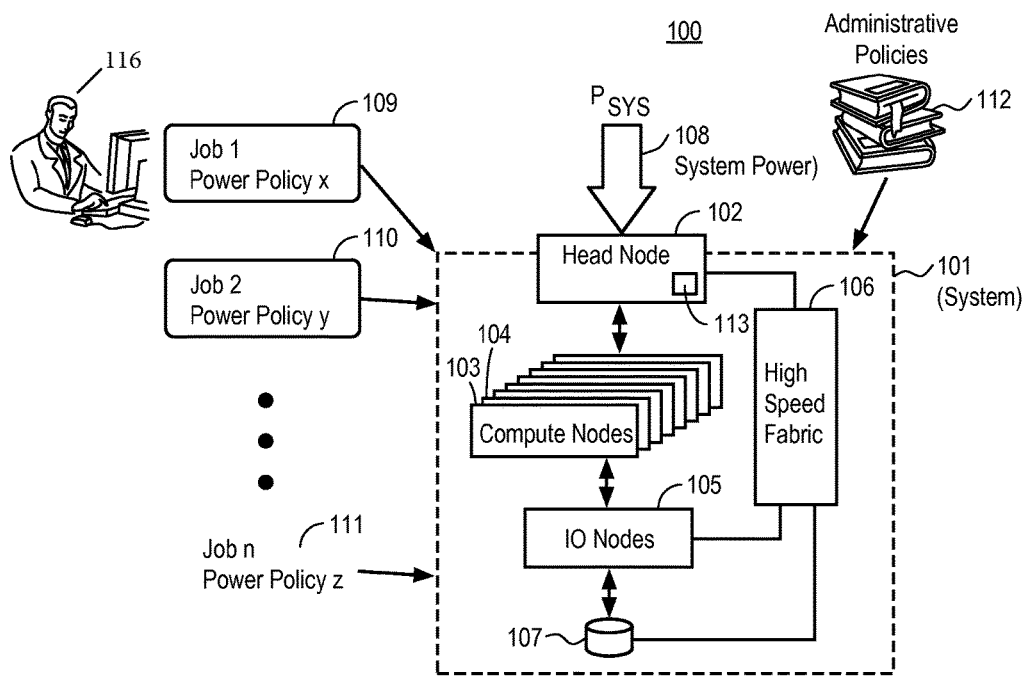

| Using Power Monitoring | Mode (A) Fixed Frequency | Mode (B) minPower $P_{JOB} = P_{min}$ | Mode (C) MaxPower $P_{JOB} = P_{max}$ | Mode (D) Auto Mode |
|---|---|---|---|---|
| Available Power | | $P_{AVAILABLE} = P_{SYS} - P_{CONSUMED}$ - Guard Band | | |
| When job cannot be started? Or when to suspend a job? | $P_{AVAILABLE}$ < Max at user selected freq | $P_{AVAILABLE}$ < User set min power, OR $P_{AVAILABLE}$ < Average Power for Pn | Workload Max for Pn > Pmax | $P_{AVAILABLE}$ < Average Power for Pn |
| Frequency | User selected | Calculated; Max Frequency where average power ≤ $P_{AVAILABLE}$ | Calculated; Max Frequency where workload Max power ≤ minimum of ($P_{AVAILABLE}$, $P_{max}$) | Calculated; Max frequency where average power ≤ $P_{AVAILABLE}$ |
| Min required power for job that cannot be suspended | = 0 if job can be suspended = Max @ selected frequency, otherwise | = 0 if job can be suspended = Min job power $P_{JOB}$ otherwise | = 0 for jobs that can be suspended = WorkloadMax @ Pn state | = 0 if job can be suspended = Max power for Pn otherwise |
| Allocated power | Max at selected frequency | Max (Min required power, average power at calculated frequency) | Min (Max power at calculated frequency, $P_{max}$) | Max (Min required power, average power at calculated frequency) |
| Readjust? | No | Max frequency for whose average power < $P_{AVAILABLE}$ | Max frequency for whose workload max power < min ($P_{AVAILABLE}$, $P_{MAX}$) | Max frequency for whose average power ≤ $P_{AVAILABLE}$ |

FIG. 6

| | Mode (A)<br>Fixed Frequency | Mode (B)<br>minPower $P_{JOB} = P_{min}$ | Mode (C)<br>MaxPower $P_{JOB} = P_{max}$ | Mode (D)<br>Auto Mode |
|---|---|---|---|---|
| No Power Monitoring | | | | |
| Available Power | | $P_{AVAILABLE} = P_{SYS} - P_{ALLOCATED}$ | | |
| When job cannot be started? Or when to suspend a job? | $P_{AVAILABLE}$ < PMP at user selected freq | $P_{AVAILABLE}$ < User set min power, OR $P_{AVAILABLE}$ < PMP for Pn | PMP for Pn > $P_{AVAILABLE}$ OR PMP at Pn > $P_{max}$ | $P_{AVAILABLE}$ < PMP for Pn |
| Frequency | User selected | Calculated; Max Frequency where PMP ≤ $P_{AVAILABLE}$ | Calculated; Max frequency where PMP ≤ minimum of ($P_{AVAILABLE}$, $P_{MAX}$) | Calculated; Max frequency where PMP ≤ $P_{AVAILABLE}$ |
| Min required power for job that cannot be suspended | = 0 if job can be suspended<br>= PMP @ selected frequency, otherwise | = 0 if jobs can be suspended<br>= Min job power $P_{JOB}$ | = 0 for jobs that can be suspended<br>= PMP @ Pn state | = 0 for jobs that can be suspended<br>= PMP @ Pn state |
| Allocated power | PMP at selected frequency | Max (Min required power, PMP at calculated frequency) | Min (PMP at calculated frequency, $P_{max}$) | Max (Min required power, PMP at calculated frequency) |
| Readjust? Only when $P_{SYS}$ changes | No | Max frequency for whose PMP < $P_{AVAILABLE}$ | Max frequency for whose PMP < min ($P_{AVAILABLE}$, $P_{MAX}$) | Max frequency for whose PMP < $P_{AVAILABLE}$ |

FIG. 7

Pavg, Per Workload 911

| Freq | Node 1 | Node 2 | Node 3 | ...... | Node 8 |
|---|---|---|---|---|---|
| 1.2 | 160 | 163 | 158 | | 159 |
| 1.3 | 167 | 172 | 165 | | 167 |
| 1.4 | 175 | 180 | 174 | | 175 |
| 1.5 | 184 | 189 | 183 | | 184 |
| 1.7 | 203 | 208 | 202 | | 203 |
| 1.8 | 214 | 219 | 213 | | 214 |
| 1.9 | 225 | 231 | 225 | | 226 |
| 2.0 | 237 | 242 | 236 | | 237 |
| 2.1 | 250 | 256 | 250 | | 249 |
| 2.2 | 263 | 270 | 263 | | 265 |
| 2.3 | 279 | 285 | 279 | | 279 |
| 2.4 | 292 | 299 | 294 | | 293 |
| 2.6 | 326 | 334 | 329 | | 328 |
| 2.7 | 345 | 352 | 348 | | 349 |
| 2.8 | 365 | 372 | 370 | | 369 |
| 2.9 | 388 | 395 | 395 | | 394 |

Pmax, Per Workload 912

| Freq | Node 1 | Node 2 | Node 3 | ...... | Node 8 |
|---|---|---|---|---|---|
| 1.2 | 164 | 168 | 164 | | 164 |
| 1.3 | 172 | 176 | 172 | | 172 |
| 1.4 | 180 | 184 | 180 | | 180 |
| 1.5 | 188 | 196 | 188 | | 188 |
| 1.7 | 208 | 216 | 208 | | 208 |
| 1.8 | 220 | 224 | 220 | | 220 |
| 1.9 | 232 | 236 | 228 | | 232 |
| 2.0 | 244 | 248 | 244 | | 244 |
| 2.1 | 256 | 264 | 256 | | 256 |
| 2.2 | 272 | 276 | 272 | | 272 |
| 2.3 | 288 | 296 | 288 | | 288 |
| 2.4 | 300 | 312 | 304 | | 304 |
| 2.6 | 340 | 348 | 340 | | 344 |
| 2.7 | 368 | 372 | 364 | | 365 |
| 2.8 | 388 | 396 | 392 | | 396 |
| 2.9 | 432 | 424 | 432 | | 424 |

PMP, Per Workload 913

| Freq | Node 1 | Node 2 | Node 3 | ...... | Node 8 |
|---|---|---|---|---|---|
| 1.2 | 181 | 180 | 175 | | 177 |
| 1.3 | 187 | 190 | 194 | | 198 |
| 1.4 | 196 | 197 | 200 | | 199 |
| 1.5 | 204 | 205 | 203 | | 205 |
| 1.7 | 222 | 226 | 228 | | 226 |
| 1.8 | 232 | 237 | 242 | | 243 |
| 1.9 | 243 | 242 | 242 | | 244 |
| 2 | 254 | 250 | 246 | | 251 |
| 2.1 | 270 | 267 | 265 | | 270 |
| 2.2 | 287 | 291 | 294 | | 299 |
| 2.3 | 303 | 308 | 308 | | 311 |
| 2.4 | 321 | 317 | 317 | | 317 |
| 2.6 | 363 | 363 | 362 | | 359 |
| 2.7 | 390 | 395 | 393 | | 399 |
| 2.8 | 424 | 427 | 431 | | 431 |
| 2.9 | 466 | 462 | 461 | | 466 |

FIG. 9A

|  | 1101 | 1102 | 1103 | 1104 |
|---|---|---|---|---|
| | | Job 1 | Job 2 | Job 3 |
| PSYS = 1700W | | Lulesh (Pr1) | Qbox (Pr2) | MCB (Pr3) |
| | | 2 Nodes | 2 Nodes | 4 Nodes |
| 1105 | Case 1 | No Power Limit | Fixed-Frequency (2.0 GHz) | Fixed-Frequency (2.1 GHz) |
| 1106 | Case 2 | No Power Limit | Fixed-Frequency (2.0 GHz) | Auto mode |

|  | 1301 | 1302 |
|---|---|---|
| | Job 1 | Job 2 |
| | MCB (Pr1) | MCB (Pr1) |
| | 4 Nodes | 4 Nodes |
| 1303  Case 1 | No Power Limit | Fixed-Frequency (2.0 GHz) |
| 1304  Case 2 | No Power Limit | Auto mode |

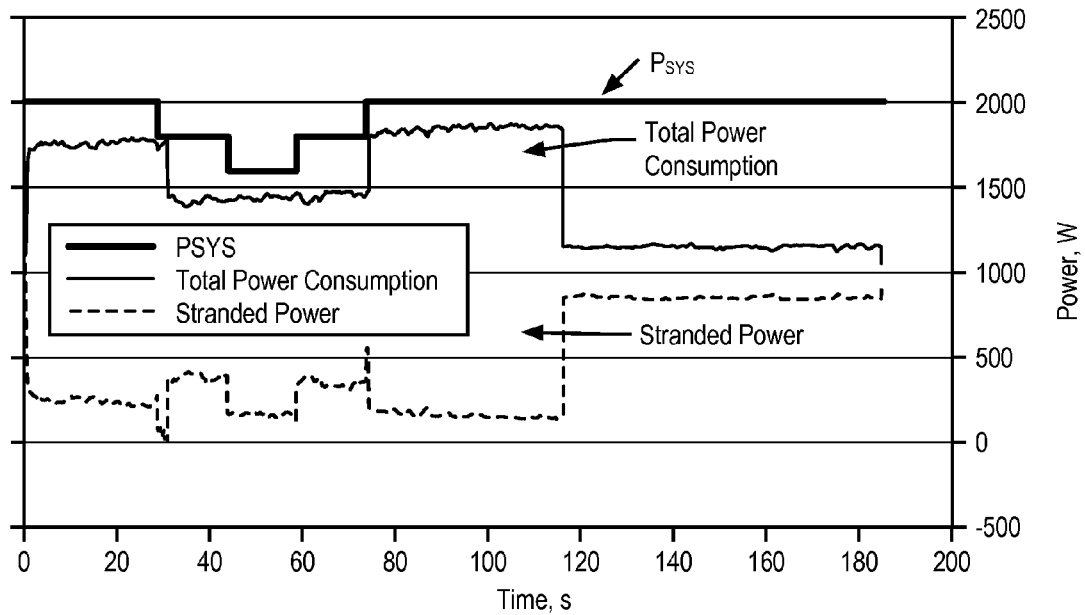
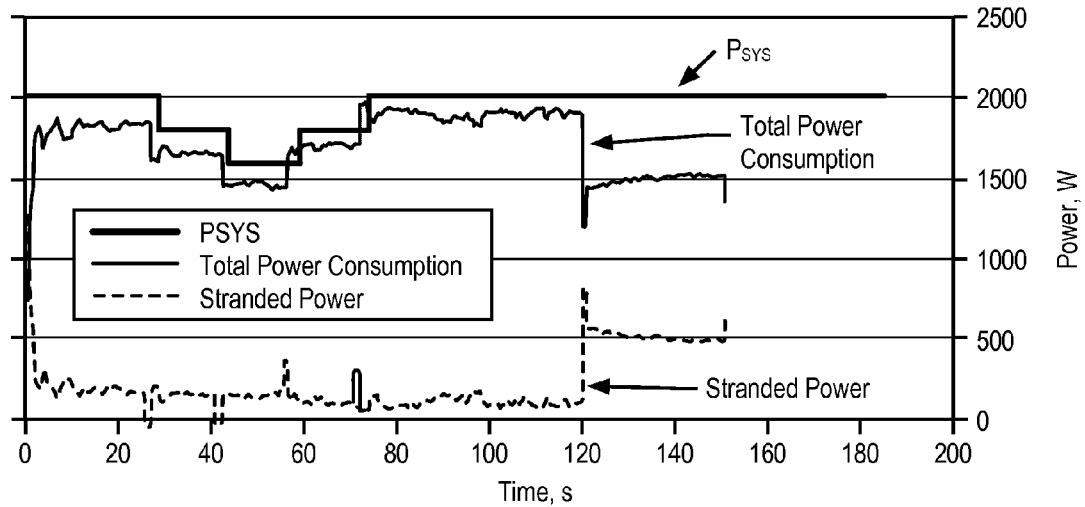
FIG. 15

POWER AWARE JOB SCHEDULER AND MANAGER FOR A DATA PROCESSING SYSTEM

CROSS-REFERENCE TO RELATED APPLICATIONS

The present application claims the benefit of prior U.S. Provisional Patent Application No. 62/040,576, entitled "SIMPLE POWER-AWARE SCHEDULER TO LIMIT POWER CONSUMPTION BY HPC SYSTEM WITHIN A BUDGET" filed on Aug. 22, 2014, which is hereby incorporated by reference in its entirety. The present application is related to the U.S. patent application Ser. No. 14/582,795 entitled METHODS AND APPARATUS TO ESTIMATE POWER PERFORMANCE OF A JOB THAT RUNS ON MULTIPLE NODES OF A DISTRIBUTED COMPUTER SYSTEM, filed Dec. 24, 2014; the U.S. patent application Ser. No. 14/582,783 entitled METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE, filed Dec. 24, 2014; the U.S. patent application Ser. No. 14/582,979 entitled ADJUSTMENT OF EXECUTION OF TASKS, filed Dec. 24, 2014; the U.S. patent application Ser. No. 14/582,985 entitled CONTROL OF POWER CONSUMPTION, filed Dec. 24, 2014; the U.S. patent application Ser. No. 14/528,988 entitled FORECAST FOR DEMAND OF ENERGY, filed Dec. 24, 2014; the U.S. patent application Ser. No. 14/528,772 entitled METHODS AND APPARATUS TO MANAGE JOBS THAT CAN AND CANNOT BE SUSPENDED WHEN THERE IS A CHANGE IN POWER ALLOCATION TO A DISTRIBUTED COMPUTER SYSTEM, filed Dec. 24, 2014; the U.S. patent application Ser. No. 14/582,743 entitled MANAGING POWER PERFORMANCE OF DISTRIBUTED COMPUTING SYSTEMS, filed Dec. 24, 2014; and the U.S. patent application Ser. No. 14/582,756 entitled PROFILING A JOB POWER AND ENERGY CONSUMPTION FOR A DATA PROCESSING SYSTEM, filed Dec. 24, 2014.

FIELD

Embodiments as described herein relate to a field of electronic device manufacturing, and in particular, to data processing systems.

BACKGROUND

Generally, a High Performance Computing (HPC) system performs parallel computing by simultaneous use of multiple nodes to execute a computational assignment referred to as a job. Each node typically includes processors, memory, operating system, and I/O components. The nodes communicate with each other through a high speed network fabric and may use shared file systems or storage. The job is divided in thousands of parallel tasks distributed over thousands of nodes. These tasks synchronize with each other hundreds of times a second. Usually an HPC system consumes megawatts of power.

Conventional high performance computing (HPC) systems HPC and other big data systems are agnostic to power. A top HPC system consumes about 20 Mega watt (MW) power delivering 33petaflops (PF) of performance. This performance is expected to grow at about an exponential rate while available power is expected to stay at or below about 20 MW. Typically, power allocation is not likely to be 20 MW and may change as often as every 15 minutes.

An existing HPC job scheduler cannot limit the HPC job power with deterministic performance. A typical job scheduler simply sets a power cap for a job. Nodes of the HPC system running the same job may run at different frequencies resulting in imbalance and undeterministic behavior.

Currently, the job's power cap is fixed, even though the facility power allocation may change, some jobs may be completed, and some jobs may be suspended. The current HPC systems do not dynamically change the job's power cap based on facility power limit and suspended job priority.

In conventional HPC systems, a system level power limit is achieved by limiting power to jobs. Typically, a computation work is divided into thousand of chunks and is distributed to thousands of nodes. These nodes synchronize with each other hundreds of times a second before making a forward progress. A slowest node in the system makes all other nodes to wait. The traditional approach to address this challenge is to run all nodes at the same frequency. Based upon computation the power consumed by nodes can go up and down. In conventional HPC systems, to ensure that the job does not consume more power than the power allocated for that job it is assumed that all nodes will consume maximum power and a lowest frequency for all nodes is selected. However, this means that some of the nodes in the system need to operate at a reduced frequency even if the system has a power headroom. In conventional system a job is not using all the power allocated or reserved for that job. This allocated and unused power is called stranded power. The non-zero stranded power is a waste of critical and scarce energy resources.

BRIEF DESCRIPTION OF THE DRAWINGS

Embodiments of the invention may best be understood by referring to the following description and accompanying drawings that are used to illustrate embodiments of the invention. In the drawings:

FIG. 1 a block diagram illustrating power inputs to a data processing system according to one embodiment.

FIG. 2 is a view illustrating a user interface to provide user inputs to schedule a job according to one embodiment.

FIG. 6 shows a table illustrating an algorithm to set uniform frequencies for four job modes when power monitoring is available according to one embodiment.

FIG. 7 shows a table illustrating an algorithm to set uniform frequencies for four job modes when power monitoring is not available according to one embodiment.

FIG. 9A is a view showing exemplary calibration tables for a power aware job scheduler and manager to dynamically allocate power for a job according to one embodiment.

FIG. 11 shows a table illustrating a mixed mode configuration having jobs running at the same time in different modes according to one embodiment.

FIG. 13 shows a table illustrating a configuration having two jobs in different modes running at the same time in according to one embodiment.

FIG. 15 shows an effect of time varying $P_{SYS}$ for two cases depicted in FIG. 13 according to one embodiment.

DETAILED DESCRIPTION

Figure 3:
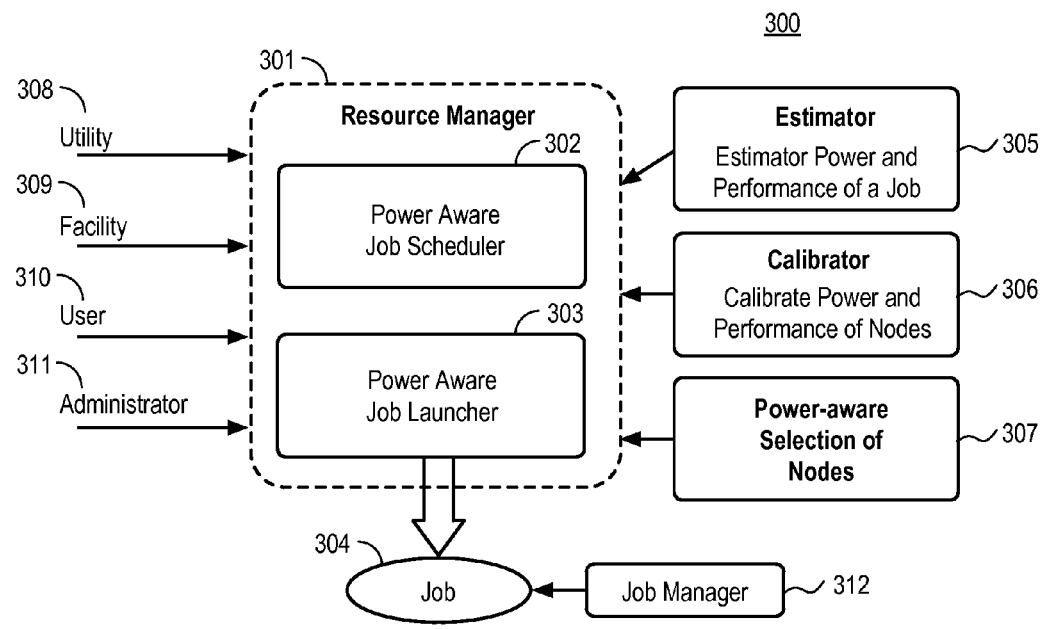
FIG. 3 is an exemplary block diagram of logic to provide power management according to one embodiment.

Methods and apparatuses to provide a power aware job scheduler and manager to operate a HPC system within power limits with high energy efficiency are described. To support operation under a power limit (cap) a HPC job launch-time scheduler and run-time manager, as described herein is power aware to deliver best performance within a fixed power budget. As a facility power allocation changes, some jobs complete or get suspended, a power aware job launch-time scheduler and run-time manager as described herein advantageously adjusts a job power allocation to provide jobs with a temporary span of power cap increase.

In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

While certain exemplary embodiments are described and shown in the accompanying drawings, it is to be understood that such embodiments are merely illustrative and not restrictive, and that the embodiments are not restricted to the specific constructions and arrangements shown and described because modifications may occur to those ordinarily skilled in the art.

Reference throughout the specification to "one embodiment", "another embodiment", or "an embodiment" means that a particular feature, structure, or characteristic described in connection with the embodiment is included in at least one embodiment. Thus, the appearance of the phrases, such as "one embodiment" and "an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment. While the exemplary embodiments have been described herein, those skilled in the art will recognize that these exemplary embodiments can be practiced with modification and alteration as described herein. The description is thus to be regarded as illustrative rather than limiting.

Methods and apparatuses to provide a power aware job scheduler and manager described herein dynamically allocate power budgets to jobs and provide dynamic control of power budgets during a job lifetime that advantageously increases the probability of launching a job earlier, causes a job to run faster, and reduces a stranded power comparing with the conventional systems. In at least some embodiments, the power allocation for a job depends upon a user's choice, for example, whether a job can be subjected to any power limit, whether a job can be suspended when system power allocation falls below a predetermined threshold, or any combination thereof. In at least some embodiments, to start a job a power needed for a job is estimated using one of power estimation techniques as described in a related U.S. patent application Ser. No. 14/582,795 entitled "METHODS AND APPARATUS TO ESTIMATE POWER PERFORMANCE OF A JOB THAT RUNS ON MULTIPLE NODES OF A DISTRIBUTED COMPUTER SYSTEM" filed on Dec. 24, 2014, and using one of power calibration techniques as described in a related U.S. patent application Ser. No. 14/582,783 entitled "METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE" filed Dec. 24, 2014.

In at least some embodiments, a uniform frequency of all nodes performing a job is changed dynamically based upon a power headroom (an available power) of the system. The uniform frequency on each node running the same job is used. HPC domain experts fine-tuned their applications at uniform frequencies. The power aware scheduler and manager advantageously do not incur any additional imbalance, as described in further detail below.

In at least some embodiments, a job power, a system power, a job's completion and a job suspension status are monitored using one or more monitoring techniques, as described in a related U.S. patent application Ser. No. 14/582,756 entitled "PROFILING A JOB POWER AND ENERGY CONSUMPTION FOR A DATA PROCESSING SYSTEM" filed Dec. 24, 2014. The live jobs' power caps are adjusted dynamically based on the monitoring. This advantageously maximizes performance of live jobs. As the HPC facility power limits changes, the jobs' power caps dynamic adjustment advantageously guarantees optimum throughput for the system.

In at least some embodiments, a power aware job scheduler and manager interfaces with a power calibrator (described in a related U.S. patent application Ser. No. 14/582, 783 entitled "METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE" filed Dec. 24, 2014) and a power estimator (described in a related U.S. patent application Ser. No. 14/582,795 entitled "METHODS AND APPARATUS TO ESTIMATE POWER PERFORMANCE OF A JOB THAT RUNS ON MULTIPLE NODES OF A DISTRIBUED COMPUTER SYSTEM" filed Dec. 24, 2014) to obtain a workload maximum power(Pmax), a workload minimum power(Pmin), a workload average power (Pavg) and a platform maximum power (PMP), as described in further detail below. As the power aware job scheduler and manager uses realistic inputs from calibrator and estimator, a power regulation guard band is advantageously minimized and performance of the system is maximized.

In one embodiment, a uniform frequency per job power regulation is provided. All nodes running the job are at a same frequency, so imbalance is not incurred. A per job power cap is set dynamically based on at least one of a facility power capability and a suspended job priority. The power aware job scheduler and manager interfaces with a launch time and run time power calibrator and estimator to make power aware scheduling more accurate relative to the conventional systems.

In at least some embodiments, a method to limit a power consumption for a data processing system and a job is described. The power for a job is limited in the system having all nodes running at a common frequency, as described in further detail below.

FIG. 1 a block diagram 100 illustrating power inputs to a data processing system 101 according to one embodiment. The data processing system 101 comprises a plurality of nodes—e.g., one or more head nodes 102, one or more compute nodes, such as a central processing unit (CPU) node 103 and a CPU node 104, one or more input-output (IO) nodes 105, one or more operating system (OS) nodes, and other nodes—coupled to a high speed fabric 106. In one embodiment, head node 102 comprises one or more operating system (OS) nodes. The high-speed fabric may be a network topology of nodes interconnected via one or more switches. In one embodiment, each of the nodes, such as nodes 103, 104 and 105 comprises one or more processors, one or more controllers, or both coupled to a memory. Head node 102 comprises a resource manager having at least a portion of a power aware job scheduler and manager 113 stored in the memory. In at least some embodiments, the resource manager is a distributed resource manager that runs on multiple nodes. In alternative embodiments, the resource manager runs on one or more head nodes, one or more CPU nodes, one or more IO nodes, or any combination thereof. In one embodiment, power aware job scheduler and manager 113 is configured to receive an indication of a mode for a job, to determine an available power for the job based on the mode and to allocate a power for the job based on the available power. In one embodiment, the power aware job scheduler and manager 113 is configured to determine a uniform frequency for the job based on the available power. In one embodiment, the power aware job scheduler and manager 113 is configured to determine the available power for the job based on at least one of a monitored power, an estimated power, and a calibrated power. The power-aware job scheduler and manager 113 is configured to receive information regarding power consumption, to distribute the power budget to each job, and to implement a uniform frequency mechanism to limit power, as described in further detail below.

In one embodiment, head node 102 comprises a power monitor (not shown), as described in the U.S. patent application Ser. No. 14/582,756 entitled PROFILING A JOB POWER AND ENERGY CONSUMPTION FOR A DATA PROCESSING filed Dec. 24, 2014; a power estimator (not shown) described in the U.S. patent application Ser. No. 14/582,795 entitled METHODS AND APPARATUS TO ESTIMATE POWER PERFORMANCE OF A JOB THAT RUNS ON MULTIPLE NODES OF A DISTRIBUED COMPUTER SYSTEM, filed Dec. 24, 2014; and a power calibrator (not shown) described in the U.S. patent application Ser. No. 14/582, 783 entitled METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE, filed Dec. 24, 2014. In one embodiment, one or more CPU nodes, such as CPU node 103 comprises a portion (not shown) of the power aware job scheduler and manager 113 stored in a memory. In one embodiment, one or more IO nodes 105 comprise a portion (not shown) of power aware job scheduler and manager 113 stored in a memory. A plurality of power inputs, such as inputs 108, 109, 110, 111 and one or more inputs 112 are provided to the system 101. Input 108 comprises data about a system power allocation (Psys). Input 109 comprise a power policy for a job X; input 110 comprises a power policy for a job Y, input 111 comprises a power policy for a job N from one or more users, such as a user 116. Input 112 comprises one or more administrative policies for a job, a job scheduler, a job launcher and rest of the resource manager, a data processing system, or any combination thereof.

In one embodiment, high speed fabric 106 is a network, e.g., an Ethernet, an Omni-Path, an InfiniB and, or other network. One or more IO nodes 105 are coupled to one or more storage nodes 107. The storage node 105 may comprise a non-persistent storage such as volatile memory (e.g., any type of random access memory "RAM"); a persistent storage such as non-volatile memory (e.g., read-only memory "ROM", power-backed RAM, flash memory, phase-change memory, etc.), a solid-state drive, a hard disk drive, an optical disc drive, a portable memory device, or any combination thereof.

In one embodiment, one or more storage nodes 107 are a part of the system 100. In another embodiment, the one or more storage nodes 107 are coupled to the one or more nodes 105 via a network. In one embodiment, system 100 is a HPC system. In another embodiment, system 100 is a cloud computing system. In one embodiment, system 100 is a HPC cluster system having thousands of nodes to run a job. In yet another embodiment, system 100 is an enterprise network system, or any other data processing system.

The head node 102 may provide a gateway to accessing the compute nodes, e.g., compute nodes 103 and 104. For example, prior to submitting a job for processing on the compute nodes, a user may be required to log-in to the system 100 which may be through the head node 102. In one embodiment, the head node 102 may accept jobs submitted by users and assist in the launching and managing of jobs being processed by the compute nodes.

In one embodiment, the compute nodes provide the bulk of the processing and computational power. The I/O nodes may provide an interface between the compute nodes and external devices (e.g., separate computers) that may provide input to the system 100 or receive output from the HPC system.

The system power allocation ($P_{sys}$) may be provided to the system 100 by, for example, a utility management facility (e.g., as determined by a system administrator or management software such as a datacenter manager). Typically, the $P_{sys}$ is used to run one or more of the jobs requested by one or more users. Each job includes a power policy to assist the system 100 in allocating power for the job and aid in the management of the one or more jobs being run by the system 100.

In addition, the administrative policies guide the management of running the jobs by providing an over-arching policy that defines the operation of the system 100. Examples of policies that may be included in the administrative policies 112 include, but are not limited or restricted to, (1) maximize utilization of all hardware and software resources (e.g., instead of running fewer jobs at high power and leaving resources unused, run as many jobs as possible to use as much of the resources as possible); (2) a job with no power limit is given the highest priority among all running jobs; and/or (3) suspended jobs are at higher priority for resumption. Such administrative policies govern the way the system 100 may schedule, launch, suspend and re-launch one or more jobs.

In one embodiment, a power availability for the system 100 is determined to reserve power for jobs that have started and cannot be suspended. The power aware scheduler is used to manage jobs with and without power limits. A power-aware scheduler is used to estimate the power required to run a job. Power-performance calibration of nodes is used to develop such an estimate. In one embodiment, the power estimate is determined based upon power-performance data collected on sample workloads or past runs of the job. Although the estimate may have a built-in guard band, actual power consumption of the job can be different. Job-level power monitoring assesses differences between the estimate and actual power consumption. Such assessments create opportunities to fine-tune power allocations to each job.

Generally, a power policy is a control mechanism used to ensure that the power consumed by a job stays within the job allocation. Power monitoring influences the power policy. Lack of power monitoring may need heavy power allocation guard bands so that the job does not consume more power than the allocation. This heavy allocation will need to be equal to or greater than the maximum power for a worst case workload.

FIG. 2 is a view illustrating a user interface 200 to provide user inputs to schedule a job according to one embodiment. User inputs comprise a mode selection for a job. A mode selection for the job comprises an indication about whether the job is subjected to a power limit, an indication about a power limit policy for the job, an indication about a suspension policy for the job, or any combination thereof. The user interface 200 comprises a display area 210, 220 and 230. The display area 210 allows a user to designate whether the job is subjected to a power limit. As shown in FIG. 2, a selection "Yes" 201 indicates that the job has a power limit, and a selection "No" 202 indicates that the job does not have a power limit.

The display area 220 pertains to the selection of one of a predetermined power-limiting policy when the user permits the job to be subjected to power-limiting. A selection 203 indicates that the policy to limit power is a fixed frequency policy ("Fixed Frequency"), in which the user designates a particular frequency 208 at which the one or more nodes on which the job will run should operate. A selection 204 indicates that the policy is a minimum job power policy ("Minimum Power Mode") according to which the user designates a minimum power 211 to be supplied to the one or more nodes on which the job will run. A selection 205 indicates that the policy is a maximum job power policy ("Maximum Power Mode") according to which the user designates a maximum power 212 to be supplied to the one or more nodes on which the job will run. A selection 209 indicates that the policy is an auto mode ("Auto Mode") according to which the frequency at which the one or more nodes operate to run the job, the power supplied to the one or more nodes on which the job is running, or both can be dynamically adjusted based on a power allocation for a job.

The display area 230 pertains to the selection of whether the job may be suspended during processing. A selection "Yes" 206 indicates that the job can be suspended. A selection "No" 207 indicates that the job cannot be suspended. In one embodiment, the job is suspended using one of job suspension techniques described in a related U.S. patent application Ser. No. 14/582,772 entitled "METHODS AND APPARATUS TO MANAGE JOBS THAT CAN AND CANNOT BE SUSPENDED WHEN THERE IS A CHANGE IN POWER ALLOCATION TO A DESTRIBUTED COMPUTER SYSTEM" filed Dec. 24, 2014.

A user interface screen is not the only method for a user to provide the data processing system 100 with input parameters such as, for example, a power policy, a minimum required frequency, a minimum required power, a maximum power and/or whether the job may be suspended. Alternatively, such parameters may be provided to the system 100 as part of the job submission and/or as a configuration file (e.g., a text file). In yet another embodiment, such parameters may be set by a system administrator, a facility manager/administrator and/or predetermined as part of a user's account with the system 100. In yet another embodiment, such parameters may be set using a job. For example, if the job does not support check pointing, the job cannot be suspended.

In one embodiment, a uniform frequency for the job is determined based on the available power. In one embodiment, the uniform frequency for the job is determined using one of the modes selected by a user. All processors of the nodes running the same job operate at the same uniform frequency. Uniform frequency power-limiting can be exercised different ways depending on how the frequency is selected and whether the same frequency is maintained throughout the job. Four policies for executing a job at a uniform frequency are used to determine the job frequency: a) a user selects a frequency of operation for the duration of a job (a fixed frequency mode), b) a user specifies a minimum power level to be allocated to a job (a minimum power mode), c) a user specifies a maximum power level to be allocated to a job, d) a user specifies an auto mode for a job. With one of an auto mode, a minimum power and a maximum power mode, the power aware job scheduler and workload manager adjusts the uniform frequency for the job based upon a power headroom.

FIG. 3 is an exemplary block diagram of logic 300 to provide power management according to one embodiment. In one embodiment, a logic 300 is a part of the system 100. The logic 300 comprises a resource manager 301 to schedule and launch jobs, a calibrator 306, an estimator 305, and one or more job managers 312. Resource manager 301 comprises a power aware job scheduler 302 coupled to a power aware job launcher 303. In one embodiment, each job has a job manager. In one embodiment, resource manager 301 is a part of a head node, such as head node 102 depicted in FIG. 1. In one embodiment, power aware job scheduler 113 depicted in FIG. 1 represents at least a portion of the resource manager 301.

Resource manager 301 receives a plurality of inputs, e.g., one or more utility rules 308, one or more facility rules 309, a user policy input 310 and an administrator policy input 311, inputs from estimator 305, calibrator 306, and power aware selector of nodes 307.

Estimator 305 is configured to estimate power and performance of a job, e.g., job 304. The estimator 305 provides the resource manager 301 with estimates of power consumption for each job enabling the resource manager 301 to efficiently schedule and monitor each job requested by one or more job owners (e.g., users). The estimator 305 may provide a power consumption estimate based on, for example, maximum and average power values stored in a calibration database, wherein the calibration database is populated by the processing of the calibrator 306. In addition, the minimum power required for each job may be considered. Other factors that may be used by the estimator 305 to create a power consumption estimate include, but are not limited or restricted to, whether the owner of the job permits the job to be subject to a power limit, the job power policy limiting the power supplied to the job (e.g., a predetermined fixed frequency at which the job will run, a minimum power required for the job, or varying frequencies and/or power supplied determined by the resource manager 301), the startup power for the job, the frequency at which the job will run, the available power to the system 100, the allocated power to the system 100, or both. In one embodiment, estimator 305 represents one of estimators described in a related U.S. patent application Ser. No. 14/582,795 entitled "METHODS AND APPARATUS TO ESTIMATE POWER PERFORMANCE OF A JOB THAT RUNS ON MULTIPLE NODES OF A DISTRIBUTED COMPUTER SYSTEM" filed Dec. 24, 2014.

Calibrator 306 is configured to calibrate power and performance of nodes of the data processing system. The calibrator 306 calibrates the power, thermal dissipation and performance of each node within the data processing system 100. The calibrator 306 may provide a plurality of methods for calibrating the nodes within the HPC system 306. In one embodiment, the calibrator 306 may provide a method of calibration in which every node within the system 100 runs a sample workload (e.g., a mini-application and/or a test script) so the calibrator 306 may sample various parameters (e.g., power consumed) at predetermined time intervals to determine, for example, (1) the average power, (2) the maximum power, and (3) the minimum power for each node. In addition, the sample workload may be run on each node at every operating frequency of the node.

In another embodiment, the calibrator 306 may provide a method of calibration in which calibration of one or more nodes occurs during the run-time of a job. In such a situation, the calibrator 306 may sample the one or more nodes on which a job is running (e.g., processing). The calibrator 306 obtains power measurements of each node during actual run-time. In one embodiment, calibrator 306 represents one of power calibrators described in a related U.S. patent application Ser. No. 14/582,783 entitled "METHOD AND APPARATUS TO GENERATE AND USE POWER, THEREMAL AND PERFORMANCE CHARACTERISTICS OF NODES TO IMPROVE ENERGY EFFICIENCY AND REDUCIGN WAIT TIME FOR JOBS IN THE QUEUE" filed Dec. 24, 2014.

In one embodiment, the interface between the power calibrator and estimator is as follows: PMP (PlatformMaxPower): for each available frequency (e.g. 1.2 GHz through a nominal frequency (P1 frequency), and a turbo frequency), a maximum power for a node (node PMP) is determined. Pmax: is the max node power over the job lifetime. Pmin: is the min node power over the job lifetime. Pavg: is the average node power over the job lifetime. The PMP is workload independent. Pmax, Pmin and Pavg are workloads dependent.

Each job requested by a user (e.g., the owner of the job) is accompanied by a user policy input 310. The user policy includes at least a decision on whether the job 304 may be subjected to a power limit, if a power limit is permitted the policy to limit the power (e.g., a fixed frequency, minimum power required, or varying frequency and/or power determined by the resource manager 301), and whether the job 301 may be suspended, as described with respect to FIG. 2.

Power aware selector of nodes 307 is configured to select nodes to run a job, e.g., job 304. In alternative embodiments, power aware selector of nodes 303 selects nodes based on the job, e.g. a job power allocation, a job configuration parameter, a job communication latency, a distance, a number of hopes, other criteria, or any combination thereof. For example, a user can specify how many cores, threads, or both are needed to run the job. For example, the user can state that the communication latency needs to be within a bound, such that the selected nodes needs to be within a limited distance (or hops of network fabric). Resource manager 301 uses power aware job scheduler 302 and power aware job launcher 303 to schedule and launch a job 304 based on the received inputs, e.g., one or more of the inputs 305, 306, 307, 308, 309, 310, 311. In one embodiment, the resource manager 301 is a software object that is responsible for allocation of compute and I/O resources for interactive and batch jobs that the users want to run. Typically, the resource manager 301 is also responsible for scheduling the jobs out of the job queue and launching the jobs to run as scheduled.

Generally, a user submits a program to be executed ("job") to a queue. The job queue refers to a data structure containing jobs to run. In one embodiment, the power aware job scheduler 302 examines the job queue at appropriate times (periodically or at certain events e.g., termination of previously running jobs) and determines if resources including the power needed to run the job can be allocated. In some cases, such resources can be allocated only at a future time, and in such cases the job is scheduled to run at a designated time in future.

When a job is scheduled to run, the job launcher 303 picks the job from the queue, and after determining that the appropriate resources (e.g., compute nodes, network, time) are allocated, the job launcher 303 spawns processes using the allocated resources to start the job in accordance with the inputs (e.g., job policy, power mode, and other input parameters) specified by the user. Job launcher 303 also can have a prologue and epilogue tasks that are performed prior to launching a job and upon termination of a job, respectively. The prologues and epilogues are used to set up the state of the computers and remove the states after the run.

A job manager 312 is configured to control job 304 to stay within an allocated power budget for the job, as described in further detail below. In one embodiment, job manager 312 is responsible for operating a job within the constraints of one or more power policies after the job has been launched. In one embodiment, job manager 312 is used to control power performance of all components (e.g., nodes, or other components) involved in execution of a job as per policies specified by at least one of the user and administrator.

Figure 4:
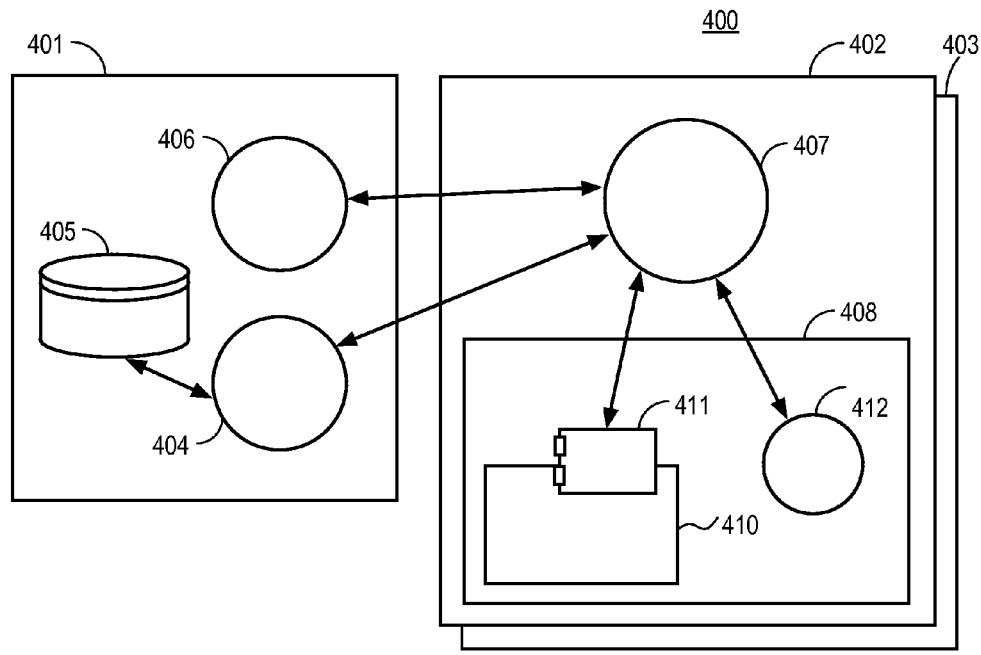
FIG. 4 is a block diagram illustrating a data processing system to manage a job using power monitoring information according to one embodiment.

FIG. 4 is a block diagram illustrating a data processing system 400 to manage a job using power monitoring information according to one embodiment. Data processing system comprises a head node 401 coupled to one or more nodes, such as a node 402 and a node 403. In one embodiment, head node 401 represents head node 102. In one embodiment, node 402 is a compute node. In one embodiment, node 402 represents compute node 103. In another embodiment, node 102 is an IO node. In another embodiment, IO node 403 represents IO node 105. Head node 401 comprises a resource manager 406 coupled to a job manager 404. In one embodiment, head node 401 acts as a cluster controller to provide a power aware job scheduler and manager.

Generally, each of the resource manager 406 and job manager 404 may be on the head node alone, or distributed over multiple nodes. In one embodiment, resource manager 406 represents resource manager 301. In one embodiment, job manager 404 represents a portion of job manager 312. In one embodiment, each of resource manager 406 and job manager 404 is on one or more head nodes. In another embodiment, each of resource manager 406 and job manager 404 is distributed on head nodes and compute nodes. In one embodiment, the resource manager 406 and job manager 404 are configured to collect job power data, as described in U.S. patent application Ser. No. 14/582,756 entitled "PROFILING A JOB POWER AND ENERGY CONSUMPTION FOR A DATA PROCESSING SYSTEM"filed Dec. 24, 2014. In one embodiment, the resource manager 406 and job manager 404 are configured to collect job power data by reading sensors. In another embodiment, the resource manager 406 and job manager 404 are configured to collect job power data by reading from a database (e.g., database 405). In yet another embodiment, the resource manager 406 and job manager 404 use other parameters, e.g., utilization, bandwidth, power specifications to develop an estimate for power consumption. In more specific embodiment, resource manager 406 gathers power information using an Intelligent Platform Management Interface (IPMI) protocol. In more specific embodiment, job manager 404 accesses a job power database 405 to store or obtain the power information for a job. In one embodiment, job power database 405 is a part of head node 401. In another embodiment, job power database 405 is coupled to head node 401 via a network.

Node 402 comprises a job manager 407. In one embodiment, job manager 407 is on one or more compute nodes. In another embodiment, job manager 407 is distributed on one or more head nodes and one or more compute nodes. Job manager 407 is coupled to job manager 404 and resource manager 406. Job data including a job power and a job frequency are communicated between job manager 404 and job manager 407. Other power data including a node power, network utilization, network bandwidth are communicated between job manager 407 and resource manager 406. In one embodiment, job manager 407 represents a portion of job manager 312. In one embodiment, each of job manager 404 and job manager 407 comprises an agent (an application, or any other computer program) stored in a memory and executed by a processor to report an input power, an output power, or both for a job. Job manager 407 is coupled to an interface 412 to obtain power data for a job. In one embodiment, the power data comprises a node power, a processor power and a memory power for a job. In one embodiment, interface 412 is an IPMI interface. Job manager 407 is coupled to a processor 410 via a storage device 411. In one embodiment, processor 410 is a CPU. In alternative embodiments, processor 410 is a graphics processing unit (GPU), a digital signal processor (DSP), or any other processor. In one embodiment, the processor frequency value is communicated between the job manager 407 and storage device 411. In one embodiment, storage device 411 comprises an operating system (OS) model specific register (MSR) module, or other storage device. In one embodiment, job manager 407 obtains and sets processor register values related to the processor frequency via the OS MSR module.

Figure 5A:
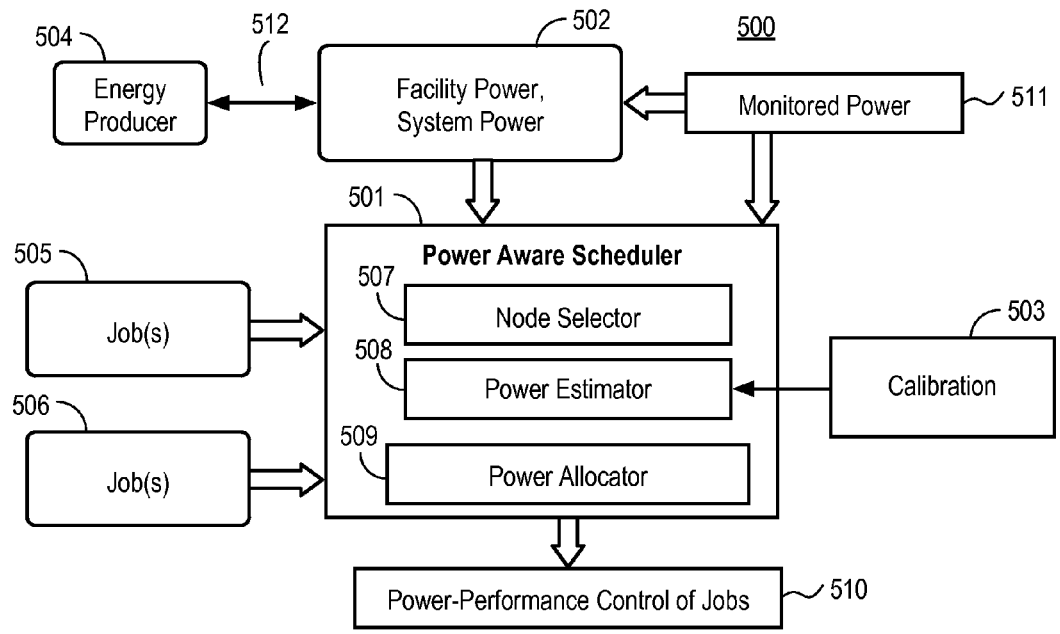
FIG. 5A is a block diagram illustrating a data processing system comprising a power aware launch time job scheduler and a run-time job manager according to one embodiment.

FIG. 5A is a block diagram 500 illustrating a data processing system comprising a power aware launch time job scheduler and a run-time job manager 501 according to one embodiment. Power aware launch time job scheduler and a run-time job manager 501 comprises a node selector 507 coupled to a power estimator 508 coupled to a power allocator 509. Power aware job scheduler and manager 501 receive at least one of the facility power and system power 502 and monitored power 511. Power aware job scheduler and manager 501 receives one or more jobs without power limit 505 and one or more jobs with at least one of a power limit and a mode input 506. The facility power and system power 502 are received from an energy producer 504 in response to the system's request via an interface 512. The interface 512 can be for example, a demand/response interface, or any other appropriate interface. In one embodiment, power estimator 508 estimates the power for a job using a power calibration 503. Node selector 507 selects one or more nodes to run a job based at least on one of the facility power and system power 502 and monitored power 511. Power allocator 509 allocates power for the job based on at least one of the node selection and power estimation. Power aware job scheduler and manager 501 controls a power performance of jobs 510.

In one embodiment, the resource manager comprising the power aware job scheduler and manager is configured to manage jobs, maintain a power budget and manage power-constrained energy efficiencies in real time.

In one embodiment, the functions of a power-aware resource manager are:
  Run jobs while maintaining the average power consumption of the system at or slightly below the provisioned power level;
  Maximize performance and energy efficiency of a job by using all of the allocated power;
  Reduce waste by operating unused resources in a sleep state; and
  Manage power consumption ramps to a facility specification.

Description of Terms
Provisioned Power to a System ($P_{SYS}$)

$P_{SYS}$ is the power allocation for a system comprising compute nodes, IO nodes, one or more head nodes (e.g., OS nodes), network switches, and a storage system. In one embodiment, the demand/response interface 512 determines $P_{SYS}$.

Available Power for a System

A power-aware scheduler is used to distribute $P_{SYS}$ among various jobs. Power available for distribution depends upon pre-allocated power and monitoring. Without monitoring: Available power=($P_{SYS}$–allocated power). With monitoring: Available power=($P_{SYS}$–power consumed by the system–guard band).

Platform Max Power (PMP)

When monitoring is not used, the power aware scheduler is forced to allocate power based on the maximum power any job could use. This maximum job power is based on the node's Platform Maximum Power (PMP). PMP is measured by running a program for a worst case workload.

Startup Power for a Job

A job needs a minimum power allocation, or a startup power, to start or resume from suspension. The power aware scheduler estimates the startup power. Without monitoring, the startup power is the PMP. With monitoring, the startup power can be determined based upon calibration. When the available power is less than the startup power, the job cannot start.

Minimum Required Power (MRP) for a Job

A scheduler may not be able to suspend or kill certain jobs due to inadequate power. There are two categories of such "special" jobs: jobs with no power limit and jobs that cannot be suspended. The power aware scheduler reserves power for such jobs before distributing the remaining power to rest of the jobs. The amount of reserved power for each "special" job is called the Minimum Required Power (MRP). For jobs with a power limit, MRP is one of a PMP or a workload max power. For a job that cannot be suspended the MRP is the power necessary to operate the job at the lowest frequency. MRP is zero for all other jobs. In one embodiment, jobs that run without a power limit are not affected by a reduction in $P_{SYS}$. Jobs that can be suspended may get suspended when $P_{SYS}$ reduces. Jobs that cannot be suspended may drop to the lowest frequency. $P_{SYS}$ may even drop to such a low level that the system cannot continue to run the "special" jobs. This could happen when the utility reduces its power allocation or a failure occurs in the power-delivery or cooling infrastructure. These can be avoided by using the demand/response interface to communicate the MRP for the system while ensuring high reliability and availability of the infrastructure.

Allocated Power for a Job

The resource manager allocates a power budget for a job. The allocation is used for two purposes: a) to determine available power for the system, and b) to take action for those cases when consumed power significantly differs from allocated power.

Stranded Power

Ideally, a job uses the entire power budget for computation. In reality, the consumption may be less. When power is allocated to a job, it is unavailable for other jobs. When the job does not use all the allocated power, the performance of the system is impacted. The difference between allocated and actual consumption is stranded power. Stranded power is unused and unavailable to generate the performance of the system, and thus wasted. The power aware job scheduler and manager described herein minimize stranded power.

Determining power for a system ($P_{SYS}$)

In one embodiment, $P_{SYS}$ is derived from the power allocation to the facility, distribution losses within the facility, voltage conversion losses outside of the server, power needed to cool the system, or any combination thereof. In another embodiment, the value of $P_{SYS}$ is provided as a scheduler parameter.

Estimation of Power Needed to Run a Job

Before a scheduler can start a job, it is estimated how much power is needed. The power estimate is governed by at least one of the following conditions: a) power and performance calibration of a node, b) the ability to monitor job level power, and c) a user-selection of a power policy to limit power for a job.

Node Calibration

Although the data processing system may use thousands of "identical" nodes, the power and performance characteristics may vary widely between nodes Variations in hardware and the environment could result in different levels of power consumption of otherwise identical nodes running the same job at the same frequency. Conversely, when hardware power limiting mechanisms force the consumption of each node to be the same, the performance of those nodes may differ. Node-level power and performance calibration enables the power aware job scheduler to generate less conservative power estimates for better decisions. In one embodiment, a program is run for a worst case workload, and the PMP of each node at each operating frequency is measured. In another embodiment, the processor frequency is varied across a plurality of representative mini-applications. For each frequency an average power, a maximum power, a power deviation, and a time to completion of the job are stored in a database.

Job Power Estimate

A node calibration database is used to estimate job power. Without dynamic power monitoring, the scheduler has to presume that the job requires PMP. Monitoring provides closed-loop control and a power estimate less than PMP. With power monitoring, even an inflexible policy with limited control knobs can base an estimate on workload maximum power. Flexible controls enable dynamic job power management. Startup power becomes workload average power. The scheduler will also need to estimate the minimum required power (MRP) for jobs that cannot be suspended. The scheduler simply sums the estimates for each node to generate the job estimate. This process can be refined by considering differences between sample and actual workloads.

User Preference for Job Power Allocation

The user can specify job priorities and power and energy policies. The exemplary policies are: a) whether or not a job should be subjected to a power limit; b) whether or not the job can be suspended; and c) for a job with a power limit, the user also selects one of a plurality of modes to enforce the limit.

Methods to Maintain Job Power within a Limit

The user indicates whether a job power can be limited. In one embodiment, the job power is maintained within a power limit based on a selection of a mode by a user, as described with respect to FIG. 2.

Figure 5B:
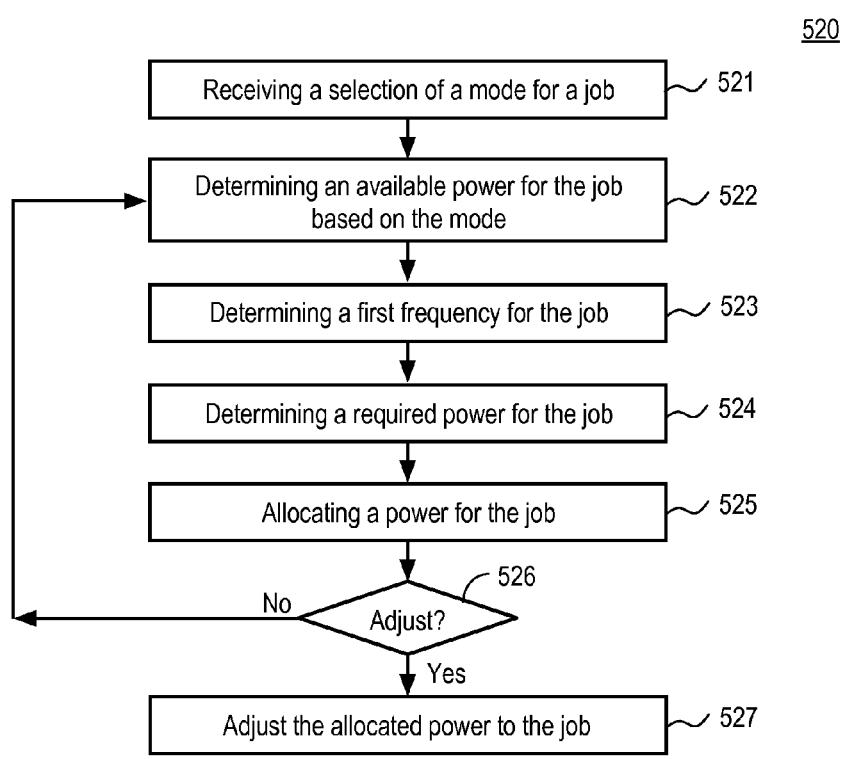
FIG. 5B is a flowchart of a method to operate a data processing system according to one embodiment.

FIG. 5B is a flowchart of a method 520 to operate a data processing system according to one embodiment. At operation 521 a selection of a mode for a job is received, as described above. At operation 522 an available power for the job is determined based on the mode. In one embodiment, the available power is determined based on at least one of a monitored power, an estimated power, and a calibrated power. At operation 523 a frequency for the job is determined based on the available power. At operation 524 an amount of required power to run the job is determined. At operation 525 a power is allocated for the job based on the required power. In one embodiment, the power is allocated based an average power for the job. At operation 526 it is determined if the allocated power is to be adjusted. In alternative embodiments, an adjustment is needed if a power allocation to the system changes, a power consumed by the jobs is different (e.g., beyond a guardband) from the power allocation, a job ends, a failure occurs, or any combination thereof. If it is determined that the allocated power is to be adjusted, the allocated power is adjusted at operation 527. If it is determined that the allocated power is not to be adjusted, method 520 returns to operation 522.

In one embodiment, based on the user input, the power aware scheduler and manager 501 determines an estimate of power required to start the job (startup power). This estimate is based on node calibration and whether the job is allowed to be suspended. The scheduler then checks for an available power. The scheduler starts the job if the available power is equal to or greater than a startup power. When dynamic monitoring is available, in certain power policies, e.g., an auto mode the uniform frequency used by all nodes of the system may be changed periodically based on a power headroom. In one embodiment, the job that started earlier in time has higher priority in using the additional power headroom. Re-evaluations of power budgets and uniform frequency are performed periodically during runtime. The available power may drop so much that all jobs cannot continue running. In that case the power aware job scheduler picks a job at the lowest priority from a list of jobs that can be suspended. In one embodiment, when the allocated power increases after suspension of a job, a suspended job is resumed.

In one embodiment, without monitoring, the integrity of the power and cooling system can only be ensured by allocating enough power for a job so that actual consumption does not exceed a worst case limit. For such a scenario, the estimated job power is based upon PMP.

In one embodiment, the user may specify that a job needs to run to completion un-interrupted, or that the job cannot be suspended. Jobs that do not implement check-pointing generally fall into this category. The power aware scheduler estimates a minimum required power (MRP) for continuous operation of the job. The available power needs to account for MRP. An aggregate of required power in a system is tracked and communicated via the demand/response interface so that $P_{SYS}$ does not fall below the aggregated MRP.

In one embodiment, the power is allocated for a job based on a job priority. In one embodiment, the job that starts or scheduled first is assumed to have a higher priority. In another embodiment, the job priority is specified by a user. In alternative embodiments, other priority mechanisms are used to allocate power to the job.

In one embodiment, the power aware job scheduler and manager are configured to maintain the rate of change of power consumption within predetermined limits. In one embodiment, the power aware job scheduler and manager are configured to maximize consumption of the allocated power and minimize the stranded power. In one embodiment, the power aware job scheduler and manager is configured to reduce power used by idle resources to improve energy efficiency and increase available power for computation. In one embodiment, the power aware job scheduler and manager is configured to deeply examine the job queue to identify and schedule the best candidates to fit within $P_{SYS}$ to schedule as many jobs as possible.

Figure 5C:
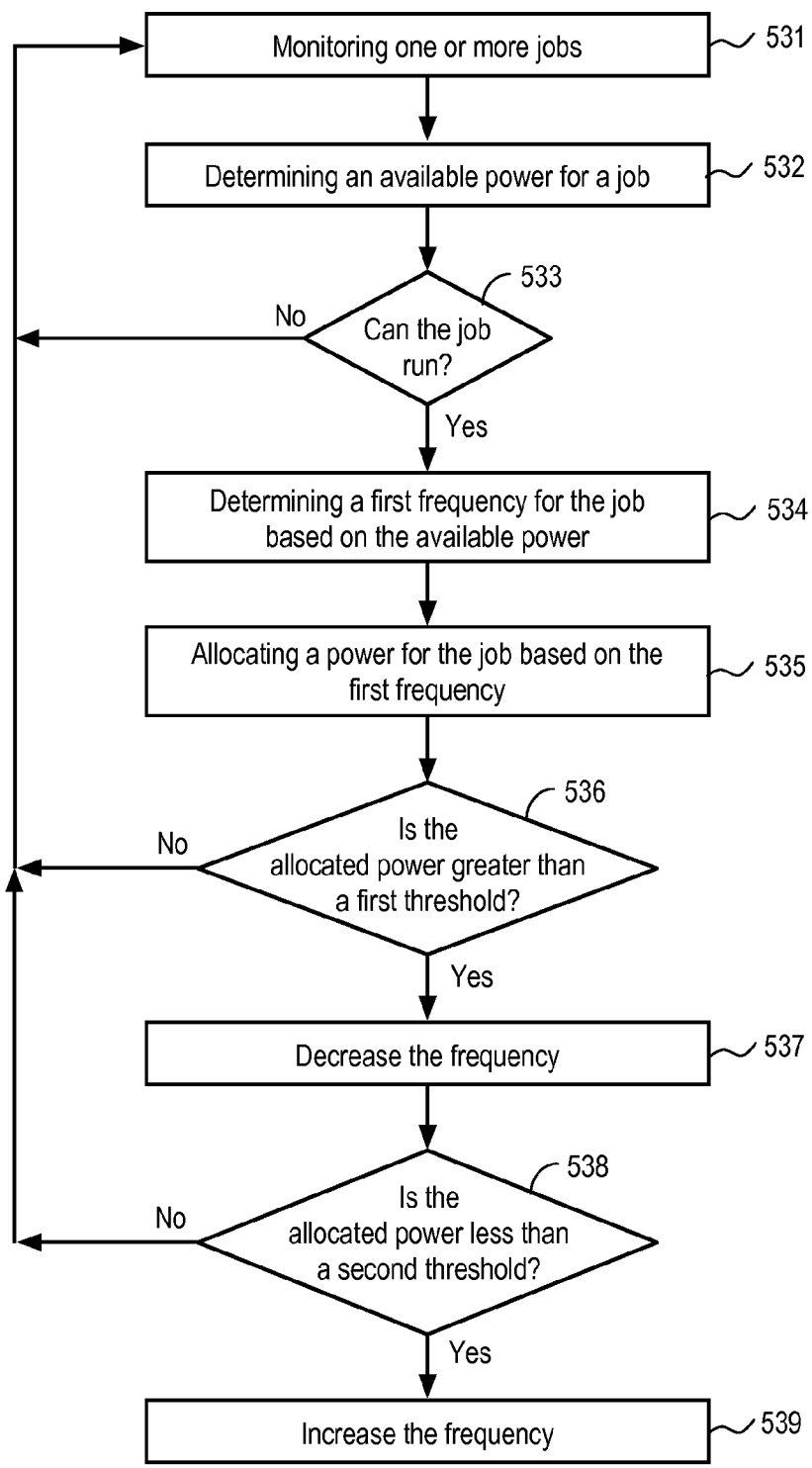
FIG. 5C is a flowchart of a method to provide a power aware job scheduler and manager according to one embodiment.

FIG. 5C is a flowchart of a method 530 to provide a power aware job scheduler and manager according to one embodiment. At operation 531 one or more jobs are monitored. At operation 532 an available power for a job is determined. At operation 533 it is determined if the available power is sufficient, so that the job can run. If the available power is not sufficient for the job to run, method 530 returns to operation 531. If the job can run, at operation 534 a frequency for the job is determined based on the available power. At operation 534 a power is allocated for the job based on the frequency. At operation 536 it is determined if the allocated power greater than a first threshold. If the allocated power is greater than the first threshold, the frequency for the job is decreased. If the allocated power is not greater than a first threshold, method 530 returns to operation 531. At operation 538 it is determined if the allocated power less than a second threshold. If the allocated power is less than the second threshold, at operation 539 the frequency for the job is increased. If the allocated power is not less than the second threshold, method 530 returns to operation 531.

FIG. 6 shows a table 600 illustrating an algorithm to set uniform frequencies for four job modes when power monitoring is available according to one embodiment. Column 601 comprises job parameters, e.g., an available power 606 for a job, a condition at which the job cannot be started or when to suspend the job 607, a frequency 608 for a job, a minimum required power for the job that cannot be suspended 609, an allocated power for a job 610, and an indication if the frequency for the job can be readjusted 611. A column 602 shows the job parameters for a Fixed Frequency Mode (Mode A); a column 603 shows the job parameters for a Minimum Power Mode (Mode B); a column 604 shows the job parameters for a Maximum Power Mode (Mode C) and column 605 shows the job parameters for an Auto Mode (Mode D). In one embodiment, a uniform frequency setting is used on every node that runs the same job.

In one embodiment, for Mode A, a user specifies a fixed frequency to run the job. If the current system power consumption (Pconsumed) is below facility power limit (Psys) and the system can accommodate the job running at the user specified fixed frequency, the power aware scheduler and manager indicates to the job launcher to launch the job. The available power for the job is determined as a difference between the system power, a consumed power, and a guard band. The job cannot be started or need to be suspended if the available power (Pavailable) is less than the maximum power (Max) for the job at the user selected frequency. The minimum required power for the job that cannot be suspended is a maximum power at the selected frequency. For jobs that can be suspended the minimum required power is zero. The allocated power for the job is a maximum power at the selected frequency. In this mode, because a user has selected that the job needs to be run at a user selected frequency the frequency of the nodes running the job does not change.

For Mode B: a user specifies a needed minimal power (Pmin) to run a job. If the available system power (system's remaining power headroom) is greater than Pmin, the power aware scheduler and manager indicates to the job launcher to launch the job. The available power for the job is determined as a difference between the systempower, a consumed power, and a guard band. The job cannot be started or need to be suspended if the available power (Pavailable) is less than the user set minimum power Pmin or if the available power is less than an average power when jobs runs at a lowest possible frequency state Pn. The frequency is a calculated frequency. In one embodiment, the frequency is calculated as a maximum frequency at which an average power consumed by the job is less or equal Pavailable. The minimum required power for the job that cannot be suspended is a minimum job power Pmin. For jobs that can be suspended the minimum required power is zero. The allocated power for the job is a maximum of a minimum required power and an average power at a calculated frequency. The frequency of the job can be adjusted as long as power consumed by the job at a new frequency is less than or equal to Pavailable.

For Mode C: user specifies a maximum power (Pmax) to run a job. The available power for the job is determined as a difference between the system power, a consumed power, and a guard band. The job cannot be started or need to be suspended, if a maximum power consumed by the job operating at the lowest frequency state Pn, is greater than Pmax. The frequency is a calculated frequency. In one embodiment, the frequency is calculated as a maximum frequency where workload maximum power is less or equal to a minimum of the Pavailable and Pmax. The minimum required power is zero for jobs that can be suspended. For the jobs that cannot be suspended the minimum required power is a workload max power while operating in a lowest frequency state Pn. For jobs that can be suspended the minimum required power is zero. The allocated power for the job is a minimum of a maximum power at the calculated frequency and Pmax. The frequency to the job in this mode can be adjusted as long as a workload maximum power consumed at a new frequency is less than a minimum of Pavailable and Pmax.

For Mode D: the power aware scheduler and manager automatically selects a frequency for the job based on the current system power allocation and consumption of power by jobs running on the system. The power aware scheduler and manager determines the remaining power headroom for the job. There are multiple policies that can affect the headroom. In one embodiment, a maximum throughput is used as a policy to affect the system power headroom. The available power for the job is determined as a difference between the system power, a consumed power, and a guard band. The job cannot be started or need to be suspended if the Pavailable is less than an average power while the job runs in the lowest frequency state Pn. The frequency is a calculated frequency. In one embodiment, the frequency is calculated as a maximum frequency at which an average power is less or equal to Pavailable. The minimum required power is zero for jobs that can be suspended. For the jobs that cannot be suspended the minimum required power is a workload max power while operating in a lowest frequency state Pn. The allocated power for the job is a maximum of a minimum required power and an average power at the calculated frequency. The frequency of the job can be adjusted to a maximum frequency at which an average power of the job at that frequency is less than Pavailable.

FIG. 7 shows a table 700 illustrating an algorithm to set uniform frequencies for four job modes when power monitoring is not available according to one embodiment. Column 701 comprises job parameters, e.g., an available power 706 for a job, a condition at which the job cannot be started or when to suspend the job 707, a frequency 708 for a job, a minimum required power for the job that cannot be suspended 709, an allocated power for a job 710, and an indication if the frequency for the job can be readjusted 711.

A column 702 shows the job parameters for a Fixed Frequency Mode (Mode A); a column 703 shows the job parameters for a Minimum Power Mode (Mode B); a column 704 shows the job parameters for a Maximum Power Mode (Mode C) and column 705 shows the job parameters for an Auto Mode (Mode D). In one embodiment, a uniform frequency setting is used on every node that runs the same job.

In one embodiment, for Mode A, a user specifies a fixed frequency to run the job. The available power for the job is determined as a difference between the system power and an allocated power. The job cannot be started or need to be suspended if the available power (Pavailable) is less than a platform maximum power (PMP) at the user selected frequency. The minimum required power for the job that cannot be suspended is the PMP power at the selected frequency. For jobs that can be suspended the minimum required power is zero. The allocated power for the job is the PMP power at the selected frequency. The selected frequency cannot be adjusted. In this mode, because a user has selected that the job needs to be run at a user selected frequency the frequency of the nodes running the job does not change.

For Mode B: a user specifies a needed minimal power (Pmin) to run a job. The available power for the job is determined as a difference between the system power and an allocated power. The job cannot be started or need to be suspended if the available power (Pavailable) is less than the user set minimum power Pmin or if the available power is less than the PMP for the job operating in a lowest frequency state, Pn. The frequency is a calculated frequency. In one embodiment, the frequency is calculated as a maximum frequency at which the PMP is less or equal Pavailable. The minimum required power for the job that cannot be suspended is a minimum job power Pmin. For jobs that can be suspended the minimum required power is zero. The allocated power for the job is a maximum of a minimum required power and PMP at a calculated frequency. The frequency can be adjusted to a maximum frequency at which PMP is less than the Pavailable.

For Mode C: user specifies a maximum power (Pmax) to run a job. The available power for the job is determined as a difference between the system power and an allocated power. The job cannot be started or need to be suspended if the PMP for a lowest frequency state, Pn is greater than Pavailable or if the PMP at Pn is greater than Pmax. The frequency is a calculated frequency. In one embodiment, the frequency is calculated as a maximum frequency at which PMP is less or equal to a minimum of the Pavailable and Pmax. The minimum required power for the job that cannot be suspended is the PMP at a lowest frequency state, Pn state. For jobs that can be suspended the minimum required power is zero. The allocated power for the job is a minimum of PMP at the calculated frequency and Pmax. The frequency can be adjusted to a maximum frequency at which PMP is less than a minimum of Pavailable and Pmax.

For Mode D: the power aware scheduler and manager automatically selects a frequency to run the job based on the current system power consumption and other jobs running conditions. The power aware scheduler and manager determines the remaining power headroom for the job. There are multiple policies that can affect the headroom. In one embodiment, a maximum throughput is used as a policy to affect the system power headroom. The available power for the job is determined as a difference between the system power and an allocated power. The job cannot be started or need to be suspended if the Pavailable is less than the PMP for a lowest frequency state, Pn. The frequency is a calculated frequency. In one embodiment, the frequency is calculated as a maximum frequency at which PMP is less or equal to Pavailable. The minimum required power for the job that cannot be suspended is the PMP at the lowest frequency state, Pn state. For jobs that can be suspended the minimum required power is zero. The allocated power for the job is a maximum of a minimum required power and PMP at the calculated frequency. The frequency can be adjusted to a maximum frequency at which PMP is less than Pavailable.

In one embodiment, when a power aware scheduler starts a job running on a set of compute nodes, the job may be subject to minimum and maximum power limits. A workload manager is configured to ensure that the job's power consumption stays within the prescribed limits. In one embodiment, the power monitoring using precise high-resolution sensors provides a reduction in guard-banding. Typically, guard-banding used in power limiting results in stranded power and lower energy efficiency.

In one embodiment, a user designates some jobs to be not power limited. The power aware job scheduler is used to estimate the maximum power the job could consume, and only start the job when the power is available. The workload manager is used to redistribute power among other (e.g., power limited) jobs to reduce stranded power and maximize efficiency. In one embodiment, if $P_{SYS}$ falls, the workload manager is to ensure that the power allocations of these designated jobs remain intact.

In one embodiment, for a Fixed Frequency Mode, a user specifies the frequency for a job. User selection may be based upon a table that indicates a performance and power for each frequency. Once a job starts in this mode, the frequency is fixed. An advantage of the fixed frequency mode is that the job does not incur overhead associated with a frequency-shift and is therefore scalable. The user may select a frequency based upon available power when the job is submitted.

In another embodiment, a user specifies a predetermined amount of power for a job. In one embodiment, the predetermined amount of power is a minimum power for the job. In another embodiment, the amount of power is a maximum power for the job. The minimum power, maximum power, or both are calculated based upon a power-performance table and the requested number of nodes for a job. Based upon available power, the scheduler calculates a best frequency for a job. When dynamic power monitoring is used, the workload manager may raise or lower the frequency while the job is running based upon increase or decrease in the available power. If the available power falls below the specified minimum power threshold, the job is suspended or terminated. An advantage of the min-Power mode and the max Power mode is that they reduce the burden on the user to guess the right frequency. Secondly, with dynamic power monitoring, the workload manager can improve performance by raising frequency. The frequency can be altered based upon power consumed by the workload while running the job. In one embodiment, to start a job, the power aware scheduler relies on calibration and estimation of power requirements, as described above.

In another embodiment, an auto mode eliminates the need for users to estimate the power or frequency to be used by their job. Uniform frequency selection is automated based upon an available power. With dynamic power monitoring, a workload manager adjusts the uniform frequency periodically based upon a power headroom. Auto mode allows a job to operate at all available frequencies. Because there is no user-defined minimum job power requirement, the job can start and continue as long as there is enough power to run the job at the lowest frequency. An advantage of Auto mode is that it reduces the probability of a job waiting for enough power or the job getting suspended due to a reduction in power availability. Auto mode increases resource usage and throughput. A user can reduce the power limit and run more jobs to use all hardware resources.

Besides the fixed frequency and min-Power modes there could be variations using minimum and/or maximum frequency, and minimum and/or maximum power. There could be modes which combine settings for frequency and power. All these require user calculation and experimentation. Auto mode removes this burden and delivers the best performance in a large number of scenarios.

In one embodiment, the power aware scheduler and manager runs at launch time and also at a programmable interval. Each time invoke, the power aware scheduler and manager re-calculates a power cap (Pavailable) for each job. This enables dynamic power capping and regulating, as discussed above. In one embodiment, a period to maintain an average power (Taverage) and a control period (Tcontrol) for a job are defined. In each control period at least one of a power budget, a power allocation and a frequency selection are re-evaluated. In one embodiment, Tcontrol is 1/10th of Taverage. Taverage is programmable. Assuming a facility needs to maintain an average power over 15 minutes, Taverage for jobs ends up being 9 seconds. For min/max Power and Auto mode, the control system evaluates about every 900 milliseconds whether the uniform frequency needs to be changed.

Figure 8:
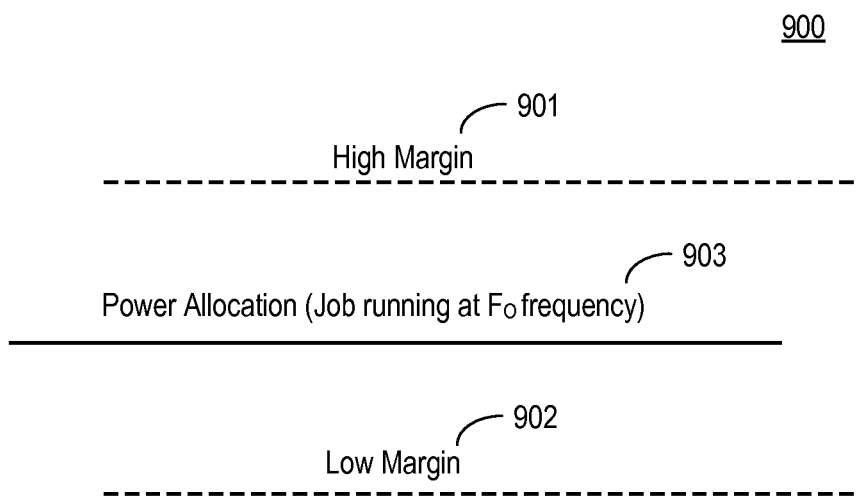
FIG. 8 illustrates power margins for a power aware scheduler and manager according to one embodiment.

FIG. 8 illustrates power margins for a power aware scheduler and manager according to one embodiment. As shown in FIG. 8, a power allocation for a job (e.g., running at operating frequency Fo) 903 is such that an actual power consumption of the job does not exceed an upper threshold (high power margin) 901. Power allocation for the job running 903 is such that an actual power consumption of the job is not lower than a lower threshold (low power margin) 902. The operating frequency Fo is decreased if the job power consumption is greater than high margin 901. The operating frequency Fo is increased if the job power consumption is lower than low margin 902.

In one embodiment, to prevent frequency oscillation, low power margin 902 is set as a difference between an average power for a job at a one bin higher frequency P (Fo+1) and an average power for a job at a current frequency Fo (Pfo). One bin higher frequency is a frequency that is higher than Fo by one bin. If hopping from the current frequency Fo to one bin higher frequency results in the power consumption that exceeds a power cap, the power aware scheduler and manager does not opt to raise the frequency. In one embodiment, high power margin 901 is set as a difference between a maximum work load power and an average workload power. In another embodiment, high power margin 901 is set as an average deviation over an average workload power. In one embodiment, a power margin is set as a difference between the platform max power(PMP) and an average power Pavg at a current frequency Fo.

In one embodiment, high power margin 901 is set to be substantially equal to a two times accuracy of power measurement. The operating frequency Fo is decreased when the power allocation for the job reduces. In another embodiment, high power margin 901 is set to be substantially equal to a current power consumption level for the job plus a power consumption one frequency bin lower than Fo. In one embodiment, low power margin 902 is set to be substantially equal to a current power consumption level for the job plus a power consumption one frequency bin higher than Fo.

FIG. 9A is a view showing an example of calibration tables for a power aware job scheduler and manager to dynamically allocate power for a job according to one embodiment. A table 911 is an example of a calibration table comprising an average power for a job per workload, per compute node at different frequencies. A table 912 is an example of a calibration table comprising a maximum power for a job per workload, per compute node at different frequencies. A table 913 is an example of a calibration table comprising a PMP per compute node at different frequencies. In one embodiment, the PMP is a platform maximum power that a node can draw determined using a special workload that makes all platforms consume maximum amount of power. Sometimes such workload is called a power virus.

Figure 9B:
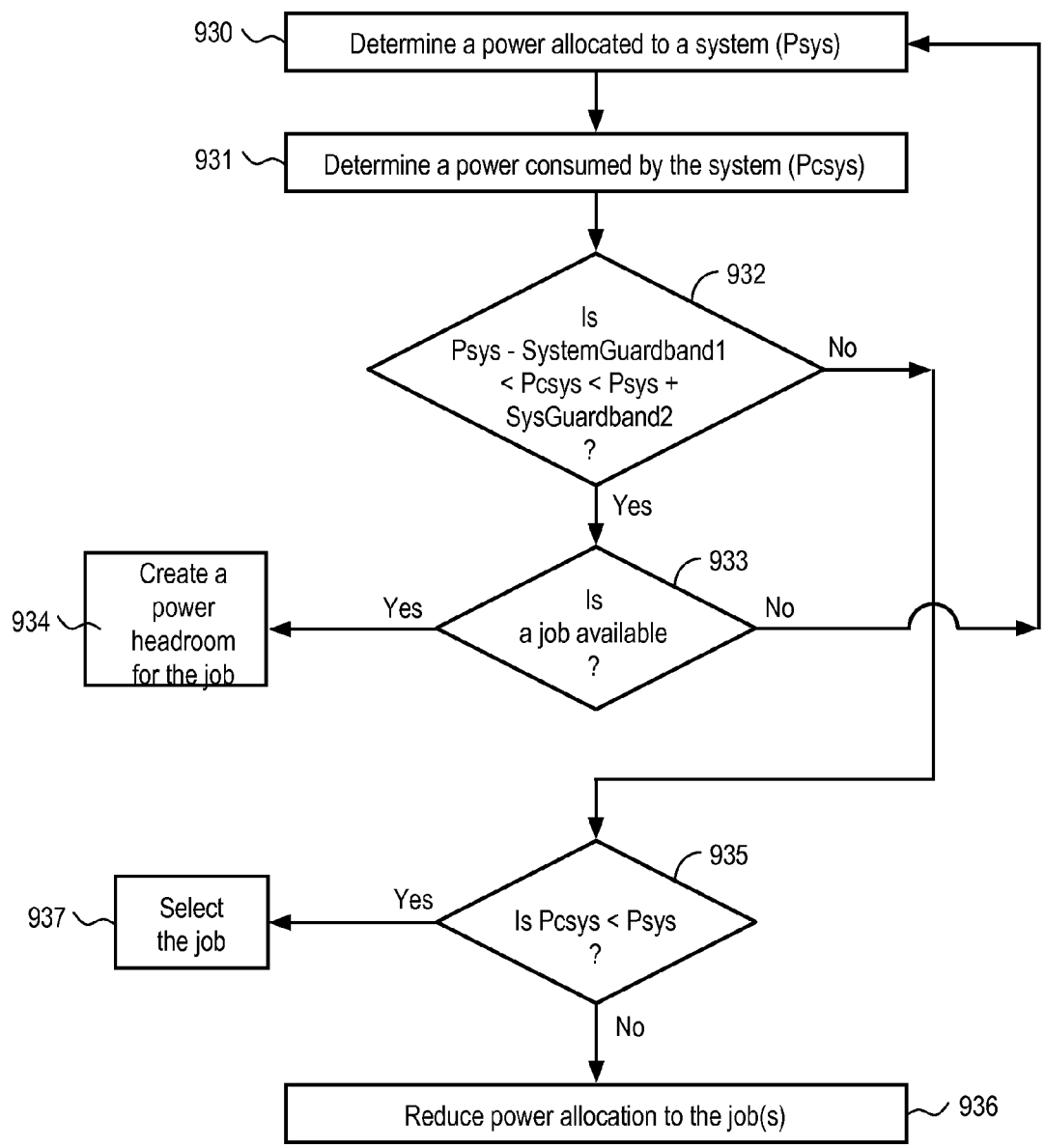
FIG. 9B is a flowchart of a method to allocate power to a job according to one embodiment.

FIG. 9B is a flowchart of a method 920 to allocate power to a job according to one embodiment. At operation 930 a power allocated to a system (Psys) is determined. At operation 931 a power consumed by the system (Pcsys) is determined. At operation 932 it is determined if Pcsys greater than a difference between the Psys and a first system guard band (SystemGurdband1) and is less than a sum of Psys and a second system guard band (SystemGuardband 2). If the Pcsys is greater than the difference between the Psys and the first system guard band (SystemGurdband1) and is less than the sum of Psys and the second system guard band (SystemGuardband 2), at operation 933 it is determined if a job is available. If the job is available, at operation 934 a power headroom for the job is created. For example, the power headroom for the job is created to maximize usage of nodes, or other hardware resources. If the job is not available, method 930 returns to operation 930. If the Pcsys is not greater than the difference between the Psys and the first system guard band (SystemGurdband1) and is not less than the sum of Psys and the second system guard band (SystemGuardband 2), at operation 935 it is determined if Pcsys is less than the Psys. If Pcsys is less than the Psys, at operation 937 the job is selected. In one embodiment, the job is selected based on the available power. If Pcsys is not less than the Psys, at operation 936 a power allocation to the job is reduced.

Figure 9C:
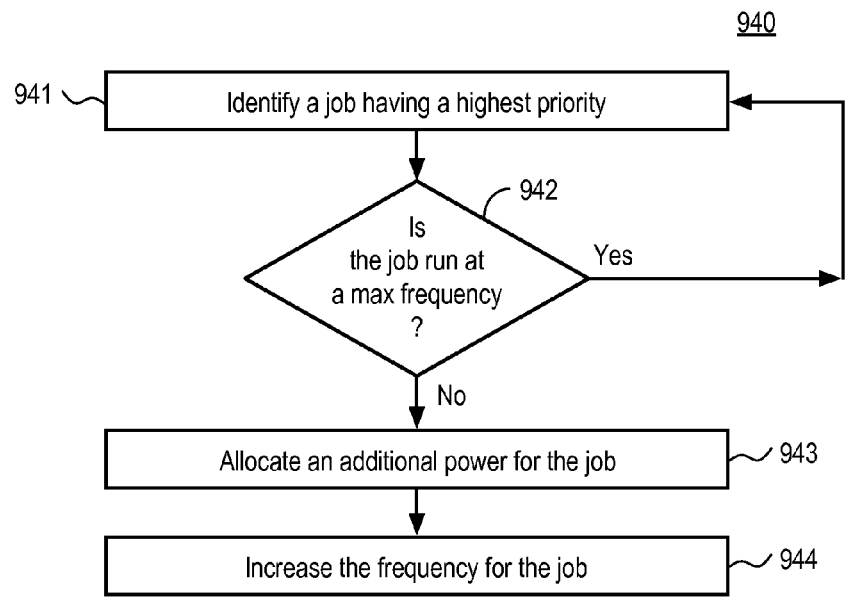
FIG. 9C is a flowchart of a method to allocate power to a job according to another embodiment.

FIG. 9C is a flowchart of a method 940 to allocate power to a job according to another embodiment. At operation 941 identifying a job having a highest priority among other jobs. In one embodiment, identifying the job involves comparing a priority of the job with a priority of other job. In one embodiment, the job priority is identified based on a position of the job in a queue. In another embodiment, the job priority is identified based on a frequency at which the job is running. For example, the job having a predetermined frequency (e.g., a lowest frequency, a highest frequency comparing with other jobs, or other predetermined frequency) can have a highest priority. In another embodiment, the job priority is identified based on a number of nodes on which the job is running. For example, the job running on a predetermined number of nodes (e.g., a largest number of nodes, a smallest number of nodes, or other predetermined number of nodes) is identified as having a highest priority. In yet another embodiment, the job priority is identified based on a power consumed by the job. For example, the job consuming a predetermined power (e.g., a largest amount of power, a smallest amount of power, or other predetermined amount of power) is identified as having a highest priority. In yet another embodiment, the job priority is identified based on a time the job is running. For example, the job running a predetermined time (e.g., a longest time, a shortest time, or other predetermined duration of time) is identified as having a highest priority. At operation 942 it is determined if the job runs at a maximum frequency. If the job runs at the maximum frequency, method 940 returns to operation 941. If the job does not run at the maximum frequency, at operation 943 an additional power is allocated to the job. At operation 944 the frequency of the job is increased.

Figure 9D:
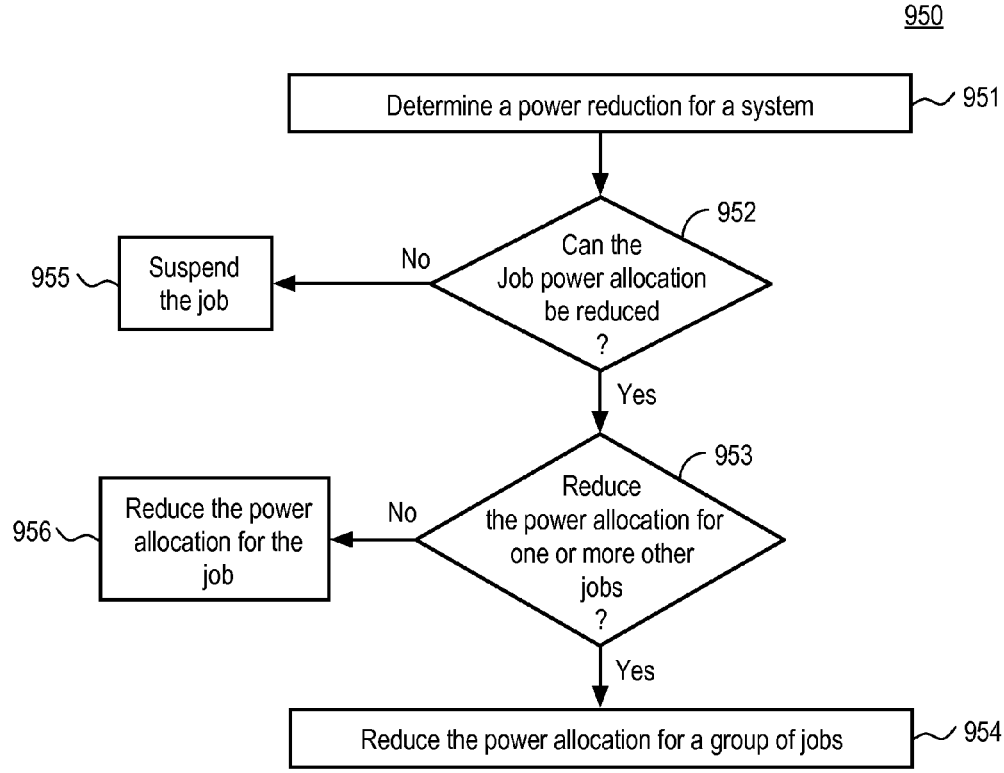
FIG. 9D is a flowchart of a method to reduce power to a job according to one embodiment.

FIG. 9D is a flowchart of a method 950 to reduce power to a job according to one embodiment. At operation 951 a power reduction for a system is determined. At operation 952 it is determined if the power allocation for a current job can be reduced. If the power allocation for the current job cannot be reduced, at operation 955 the current job is suspended. If the power allocation for the current job can be reduced, at operation 953 it is determined if the power allocation for one or more other jobs can be reduced. If the power allocation for one or more other jobs cannot be reduced, at operation 956 the power allocation for the current job is reduced based on the power allocation for the system. If the power allocation for one or more other jobs can be reduced, at operation 954 the power allocation is reduced for a group of job including the current job and the one or more other jobs. In one embodiment, the power allocation for the group of job is reduced by one job at a time. In another embodiment, the power allocation is reduced for all jobs in the group substantially simultaneously.

Figure 9E:
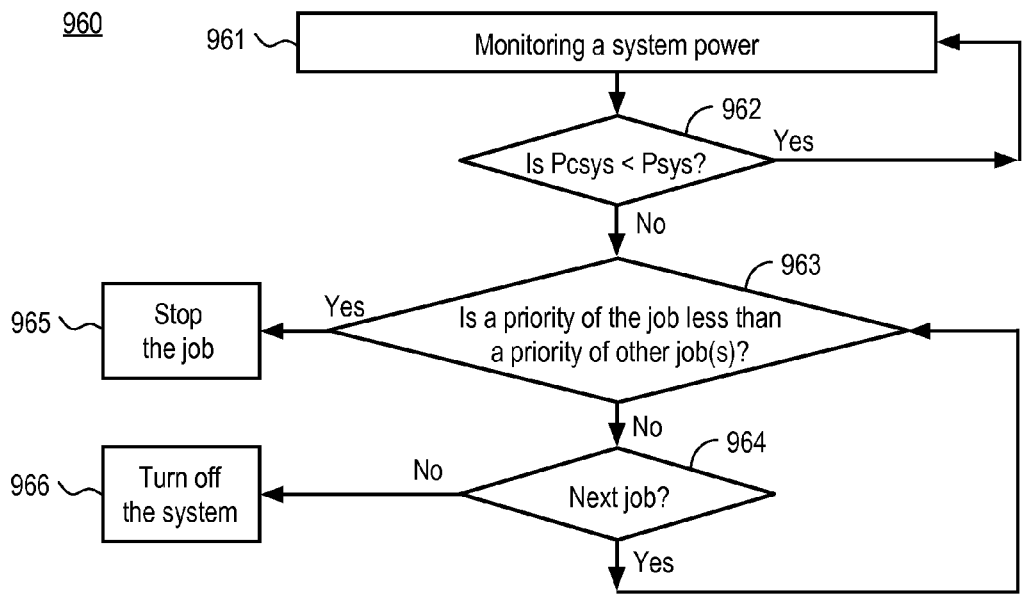
FIG. 9E is a flowchart of a method to terminate a job according to one embodiment.

FIG. 9E is a flowchart of a method 960 to terminate a job according to one embodiment. At operation 961 a power consumed by a system (Pcsys) is monitored. At operation 962 it is determined if a power consumed by the system (Pcsys) is less than a power allocated to the system (Psys). If the Pcsys is not less Psys, at operation 963 it is determined if a priority for a current job is less than a priority of other jobs. If the priority for the current job is less than the priority of other jobs, at operation 965 the job is stopped. If the priority of the current job is not less than a priority of other jobs, at operation 964 it is determined if there is a next job in a queue. In one embodiment, operation 964 is performed, if it is determined that the Pcsys is greater than Psys. If there is a next job in the queue, method 960 goes back to operation 963. If there is no next job in the queue, at operation 966 the system is turned off. In one embodiment, the job priority is identified based on a position of the job in a queue. In another embodiment, the job priority is identified based on a frequency at which the job is running. In 5yet another embodiment, the job priority is identified based on a number of nodes on which the job is running. In yet another embodiment, the job priority is identified based on a power consumed by the job. In yet another, the job priority is identified based on a time the job is running, as described above.

Figure 9F:
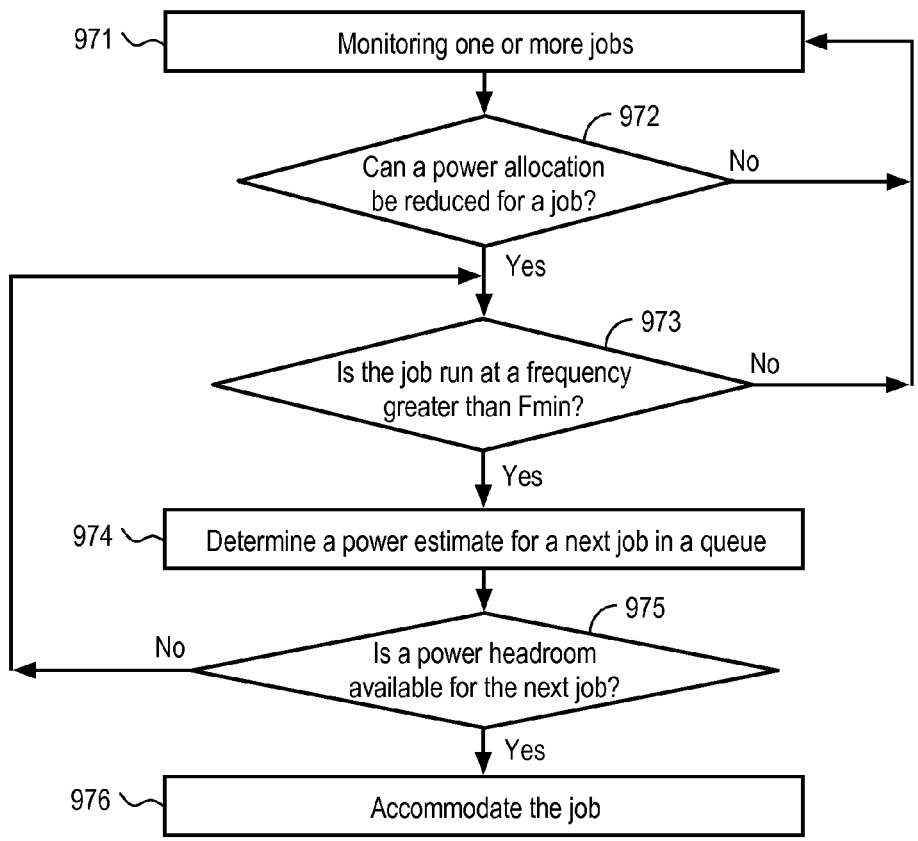
FIG. 9F is a flowchart of a method to rebalance power to accommodate more jobs according to one embodiment.

FIG. 9F is a flowchart of a method 970 to rebalance power to accommodate more jobs according to one embodiment. At operation 971 one or more jobs are monitored. At operation 972 it is determined if a power allocation for a current job can be reduced. If the power allocation for the current job cannot be reduced, method goes back to operation 971. If the power allocation for the current job can be reduced, at operation 973 it is determined if the job runs at a frequency greater than a minimum frequency. If the job runs at a frequency not greater than the minimum frequency, method returns back to operation 971. If the job runs at a frequency greater than the minimum frequency, at operation 974 a power estimate for a next job in a queue is determined.

At operation 975 it is determined if a power headroom is available for a next job. If the power headroom is available for the next job, at operation 976 the next job is accommodated. If the power headroom is not available for the next job, method 970 goes back to operation 973.

Figure 9G:
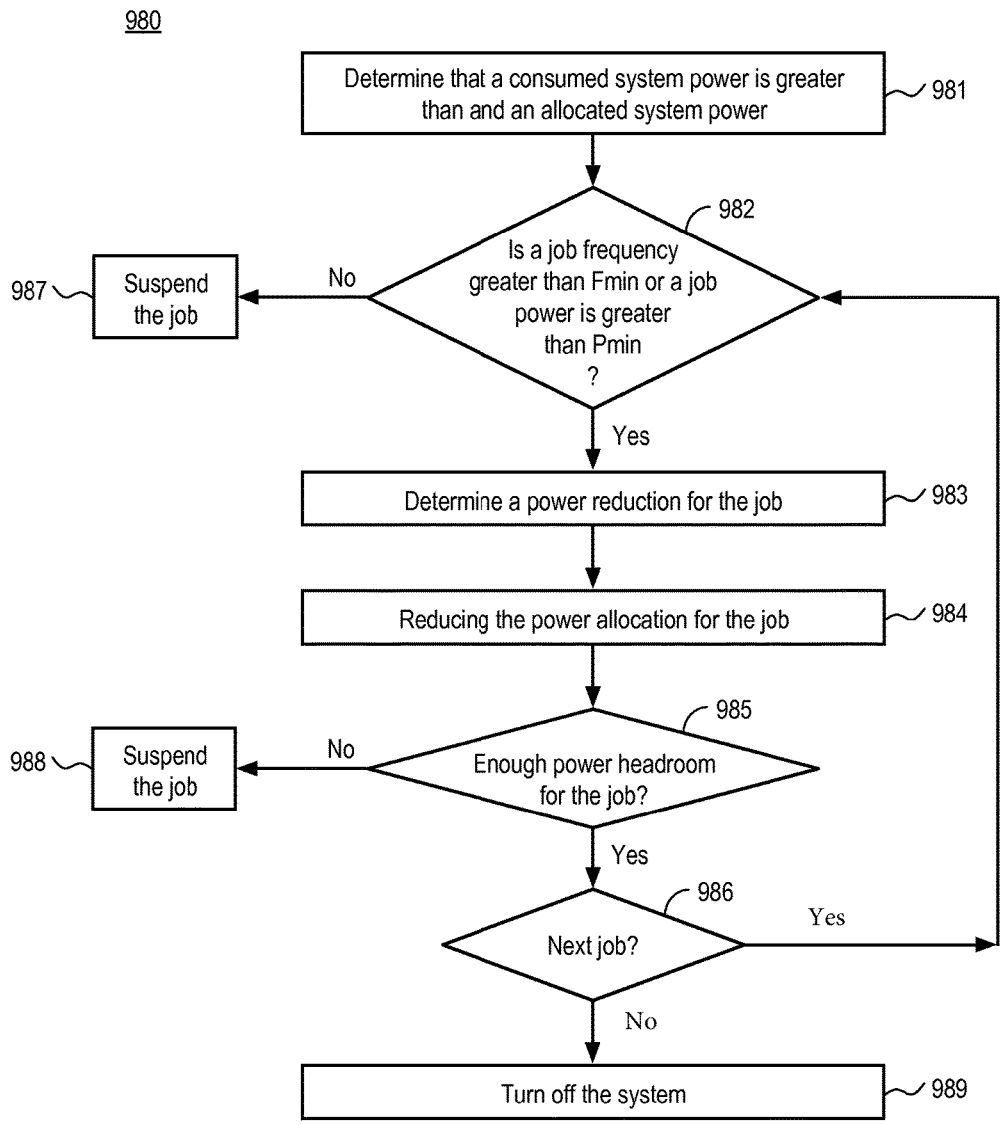
FIG. 9G is a flowchart of a method to reduce power to jobs according to another embodiment.

FIG. 9G is a flowchart of a method 980 to reduce power to jobs according to another embodiment. At operation 981 it is determined that a consumed system power (Pcsys) is greater than an allocated system power (Psys). At operation 982 it is determined if an operating frequency (Fo) of a job greater than a minimum operating frequency (Fmin) or a job power is greater than a minimum Power for the job. If Fo is not greater than Fmin, the job is suspended at operation 987. If Fo is greater than Fmin, a power reduction for the job is determined at operation 983. At operation 984 a power allocation for the job is reduced based on the power reduction. At operation 985 it is determined if a power headroom is sufficient to run the job. If the power headroom is sufficient to run the job, at operation 986 it is determined if there is a next job available. If the power headroom is not sufficient to run the job, at operation 988 the job is suspended. If there is the next job, method 980 returns to operation 982. If there is no next job, at operation 989 the system is powered off.

An exemplary design work flow to operate a data processing system comprising a power aware job scheduler and manager according to one embodiment is shown below. For simplicity, only two job manager policies are used. It is understood by one of ordinary skill in the art of the data processing systems that more than two job manager policies can be used.

1. Calibrator
1.1.1. Inputs
1.1.2. Workload: Command to run
1.1.3. List of nodes (N1, N2 . . . Nn)
1.1.2. The run command is modified based upon # cores per node and number of nodes
1.1.3. List of frequencies (F1, F2, . . . Fn)
1.2. Output saved in data base
1.2.1. For each frequency
1.2.1.1 Power (workload-Max, Workload-average)
1.2.1.2 Temperature (workload-Max, Workload-average)
1.2.1.3 Time of completion
2. Estimator-P (Power Estimator)
2.1 Input
2.1.1 Workload: User indicates a workload (from list of sample workloads that is closer to application)
2.1.2 List of nodes (M1, M2 . . . Mn)
2.1.3 List of frequencies (F1, F2, . . . Fn)
2.2 Output
2.2.1 For each frequency
2.2.1.1 Power (workload-Max, Workload-average, workload-min (reserved power)); reserved power: power required to keep the job running at the lowest frequency (min Power)
2.2.1.2 Temperature (workload-Max, Workload-average)
2.2.1.3 Time of completion
3. Estimator-F (Frequency Estimator)
3.1 Input
3.1.1 Workload: User indicates a workload (from list of sample workloads that is closer to application)
3.1.2 List of nodes (N1, N2 . . . Nn)
3.1.3 Available Power
3.1.4 Power levels (PMP, WorkloadMax, WorkloadAverage) Only one the parameters are defined others are zero
3.2 Output
3.2.1 Frequency of operation $F_S$,
3.2.2 JobPower@$F_S$, JobPower@$F_{(S-1)}$, JobPower@$F_{(S+1)}$;
$F_S$=Proposed frequency; $F_{(S+1)}$=One frequency greater than Proposed frequency; $F_S$=One frequency less than Proposed frequency;
4. Power Aware Scheduler and Job Managers
Assumptions:
  1. Power monitoring is available.
  2. Nodes have single tenancy. At a time a node runs only one job. In the same node cores are not divided across multiple jobs.
4.1 Input
4.1.1 Job
4.1.1.1 Job Power limit (Yes/No)
4.1.1.2 Can the job be suspended (Yes/No)
4.1.1.3 JobManager policy # between (1:2)
  This will change as more power policies are added,
  JobManager Policy #1: User selects a frequency of operation for a job
  JobManager Policy #2: Auto mode (JobManager selects/modifies frequency for the job based upon power headroom)
Power Aware Scheduler
  (A) $P_{SYS}$: Power allocated to a system
  (B) $P_{CSYS}$: Power consumed by a system
  (C) SystemGuardband (1:2): Value to dampen system level control events
    a. SysGuardband1 margin when lower than $P_{SYS}$. Example 10% lower
    b. SysGuardband2 margin when higher than $P_{SYS}$. Example 1% higher.
  (D) $P_{JOB}$: Power allocated to a job
  (E) $P_{CJOB}$: Power consumed by a job
  1.1 Is $P_{SYS}$−SystemGuardband1<$P_{CSYS}$<$P_{SYS}$+SystemGuardband2 (Is system consuming power less than allocated?)
    a. Yes →
      i. Is there a job in queue (either new or suspended) ready to run? Ready run means it has all the resources except power
        A. Yes Go to 1.13 to reduce power of jobs that are running to make headroom for a new/suspended job
        B. No Go to 1.1 and continue to monitor
    b. No → Continue to 1.2
  1.2 Is $P_{CSYS}$<$P_{SYS}$?
    a. Yes; either resume (a suspended job or start a new job) or allocate more power to running job; Go to 1.3 (Multiple approaches possible)
    b. No; System consuming more power; reduce allocation to Jobs; Go to 1.10.
  1.3 When there is more power to allocate Select top priority job that is ready to run (next job) (Multiple approaches possible) (There are two possibilities here, (a) compare priority of new job with priority of suspended job and start/resume whichever is higher priority or (b) Resume suspended job i.e. assume suspended job at higher priority).
    a. Do you want to resume a suspended job?
      i. Yes next job is highest priority suspended job Go to 1.6
      ii. No continue to 1.4
  1.4 Can a new job be started? (This assumes a policy is used indicating that it is better to use as many nodes as possible to run as many jobs as possible. That means allocated power get pancaked across multiple jobs) (Multiple approaches possible)
    a. Yes continue to 1.5
    b. No, go to 1.9

1.5 if Job Subjected to power limit?
   a. Yes → Continue to 1.6
   b. No → Set JobProfile=PMP, JobFrequency=$F_{MAX}$; Go to 1.7
1.6 Job manager policy
   a. For JobManager Policy #1 set JobProfile (user selected from list see 0) JobFrequency=$F_{UserSelected}$; Go to 1.7a
   b. For JobManager Policy #2 set JobProfile (user selected from list see 0); Go to 1.7c
1.7 Allocate power to Job and select frequency of operation
   a. Get power from Estimator-P (Workload=JobProfile, Frequency=JobFrequency, List of nodes); Output JobPower
   b. Is (JobPower>($P_{SYS}$+SystemGuardband2−$P_{CSYS}$)? (User selected a frequency for JobManager Policy #1 but there is not enough power to run in that mode)
      i. Yes, Go to reduce power of running jobs 1.10 (Reduce power of running jobs so that we can accommodate a new job) If that fails we say there is not enough power to start a new job. (Multiple approaches possible)
      ii. No Go to 1.8
   c. For Job to run in auto mode
      i. Get frequency from Estimator-F (Workload=JobProfile, Available Power=($P_{SYS}$−SystemGuardband1−$P_{CSYS}$), Power level=WorkloadAverage), Expected output Job-Frequency & JobPower (This also provides power levels for the job when frequency can be raised or should be lowered).
1.8 Launch a job with allocation of power to a job $P_{JOB}$=JobPower; Frequency=JobFrequency. Go to 1.1
1.9 (New job cannot be started so allocate more power to running jobs)
   a. Excess power=$P_{SYS}$−SystemGuardband1−$P_{CSYS}$
   b. Identify higher priority job that is already running and running in an Auto mode (JobManager Policy #2); Say Job X
   c. Is Job X frequency=$F_{MAX}$? (Is job already running at maximum frequency)
      i. Yes, get the next job in priority and go to 1.9c (If you exhaust all such jobs that means you have excess power that you cannot use to run any new job or existing job at higher performance, in that case stop here).
      ii. No, continue
   d. Allocate additional power to Job X,
      i. Use Estimator-F get new frequency and new Job power by increasing available power for the job New available power for Job X=Excess power+Old JobPower for job X (Multiple approaches possible) (you could increase frequency by one step instead)
   e. Go to 1.7c.i.
1.10 (Method to reduce power to jobs) You are here because $P_{CSYS}$>$P_{SYS}$+SystemGuardband2 (i.e. power consumption by one or more jobs has exceeded expectations) or $P_{SYS}$ reduced from previous value. (Multiple approaches possible)
   a. Required reduction in power=$P_{CSYS}$−$P_{SYS}$.
   b. Are any jobs running in auto mode?
      i. Yes; go to 1.10c to reduce power to jobs in auto mode
      ii. No there is no opportunity to reduce power to job go to 1.11 suspend jobs
   c. Reduce power to all jobs simultaneously?
      i. Yes go to 1.14 to reduce power allocation to all jobs in auto mode
      ii. No, reduce power one job one frequency at a time just continue to next step
   d. Identify lowest priority job that is already running and running in an Auto mode (JobManager Policy #2); Say Job Y
   e. Is Job Y frequency=$F_{MIN}$? (Is job already running at lowest frequency)
      i. Yes, get the next higher priority job and go to 1.10e (If you exhaust all such jobs that means you cannot reduce power consumption by any job and you need to suspend a job to do that Go to 1.11
      ii. No, continue (Job Y is running at frequency greater than $F_{MIN}$ so we can reduce frequency).
   f. Reduce power allocation to Job Y
   g. Is for Job Y−Job Y JobPower@$F_{(S-1)}$)→≥($P_{CSYS}$−$P_{SYS}$)?
      i. If Yes, $P_{JOB}$ for Job Y=Old $P_{JOB}$ for Job Y−JobPower@$F_{(S-1)}$,
      ii. If No,
         A. Job Y −(JobPower@$F_{(S-1)}$)?<($P_{CSYS}$−$P_{SYS}$)
         B. Reduce power of all jobs running in auto mode one by one until ($P_{CSYS}$<$P_{SYS}$)
         C. Iterate this process until you reduce frequency of jobs in auto mode one frequency at a time or until a job reaches $F_{MIN}$.
         D. If all jobs (in Auto mode) reduced to $F_{MIN}$, and still ($P_{CSYS}$>$P_{SYS}$) then go to 1.11 to suspend one or more jobs.
1.11 (Suspending a Job) You are here because ($P_{CSYS}$>$P_{SYS}$) and all jobs in auto mode are operating at $F_{MIN}$. You need to suspend a job in order to reduce $P_{CSYS}$. (Multiple approaches possible)
   a. Identify lower priority job (fixed frequency or auto mode) that can be suspended and suspend the job.
   b. New $P_{CSYS}$=Old $P_{CSYS}$−Power consumed by the job that was suspended.
   c. Check new $P_{CSYS}$ to see if it below $P_{SYS}$. If not go to 1.11a.
   d. If you suspend all jobs (that can be suspended and still ($P_{CSYS}$>$P_{SYS}$), then you need to kill a job that cannot be suspended and resumed.
1.12 (Terminate a job that cannot be suspended) You are here because you need to stop a job that cannot be suspended. Assumption; all the jobs that can be suspended already are.
   a. Identify lower priority job that cannot be suspended and stop (kill) that the job.
   b. Check new $P_{CSYS}$ to see if it below $P_{SYS}$. If not go to 1.12a.
   c. If you stopped all jobs and still ($P_{CSYS}$>$P_{SYS}$), then you need to power off the system.
1.13 (Rebalancing power to accommodate more jobs): You are here because there are nodes available to run a job (new or suspended) but $P_{CSYS}$ is close to $P_{SYS}$. That is not power headroom. We will check if power headroom can be created to run the job.
   a. Are there any jobs running in auto mode?
      i. Yes continue to 1.13b
      ii. No go to 1.1
   b. Is any of the jobs in auto mode running at frequency greater than $F_{MIN}$?
      i. Yes Continue go to 1.13c
      ii. No go to 1.1 c. Get estimate for power (JobPowerForNext) for the next job in queue (new or suspended) (If next job prefers auto mode, power for $F_{MIN}$ state)
d. We need to reduce power allocation to all running jobs in order to create a headroom=JobPowerForNext.
   i. Get frequency and power consumed for each job in auto-mode
   ii. Estimate if power to all jobs running in auto mode can be reduced in proportion to their current power consumption in a such way so that while new job starts all the running jobs will operate at $F_{MIN}$ or higher frequency. (proportionality can be based upon current power consumption, Number of nodes or priority)
   iii. Is there enough power headroom?
      A. Yes reduce power to jobs in auto mode and go to 1.1.
      B. No check the next job in ready to run queue and go to 1.13c. Do this exhaustively till the queue ends. When queue ends go to 1.1

1.14 (Reduce power to jobs in auto mode because $P_{CSYS} > P_{SYS}$)
a. Is any of the jobs in auto mode running at frequency greater than $F_{MIN}$?
   i. Yes, continue to 1.14b
   ii. No; there is no opportunity to reduce power to jobs in auto mode go to suspend jobs to do that go to 1.11.
b. Required reduction in power, ReducePower=($P_{CSYS} - P_{SYS}$-SytemGuardband1)
c. We need to reduce power allocation to all running jobs in order to create a headroom=ReducePower.
   i. Get frequency and power consumed for each job in auto-mode
   ii. Estimate if power to all jobs running in auto mode can be reduced in proportion to their current power consumption in a such way so that while new job starts all the running jobs will operate at $F_{MIN}$ or higher frequency. (proportionality can be based upon current power consumption, Number of nodes or priority)
   iii. Is there enough power headroom?
      A. Yes reduce power to jobs in auto mode and go to 1.1
      B. No; we need to suspend a job go to 1.11

Figure 9H:
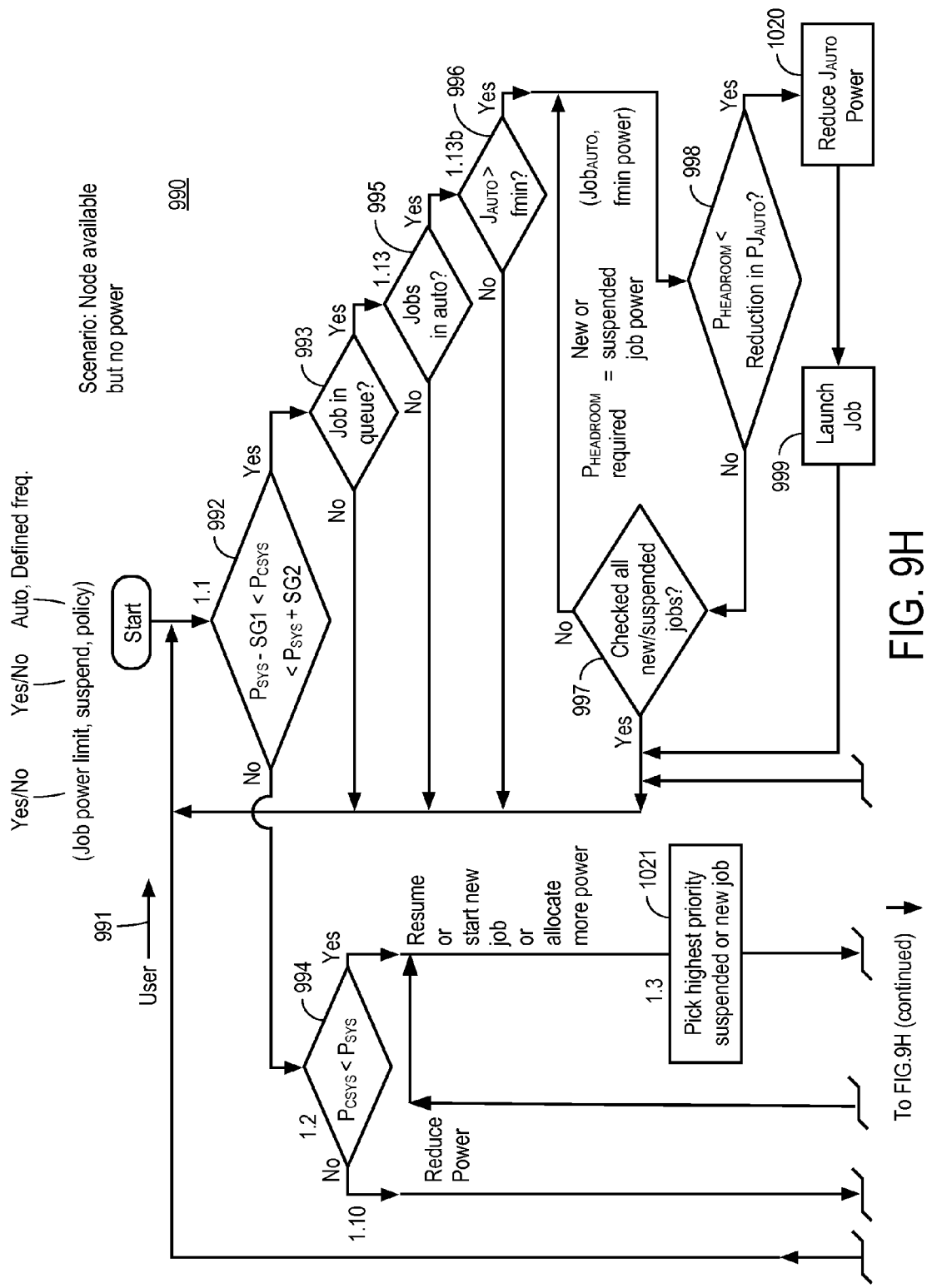
FIG. 9H is a flowchart of a method to provide a power aware job scheduler and job managers according to one embodiment.
Figure 9H:
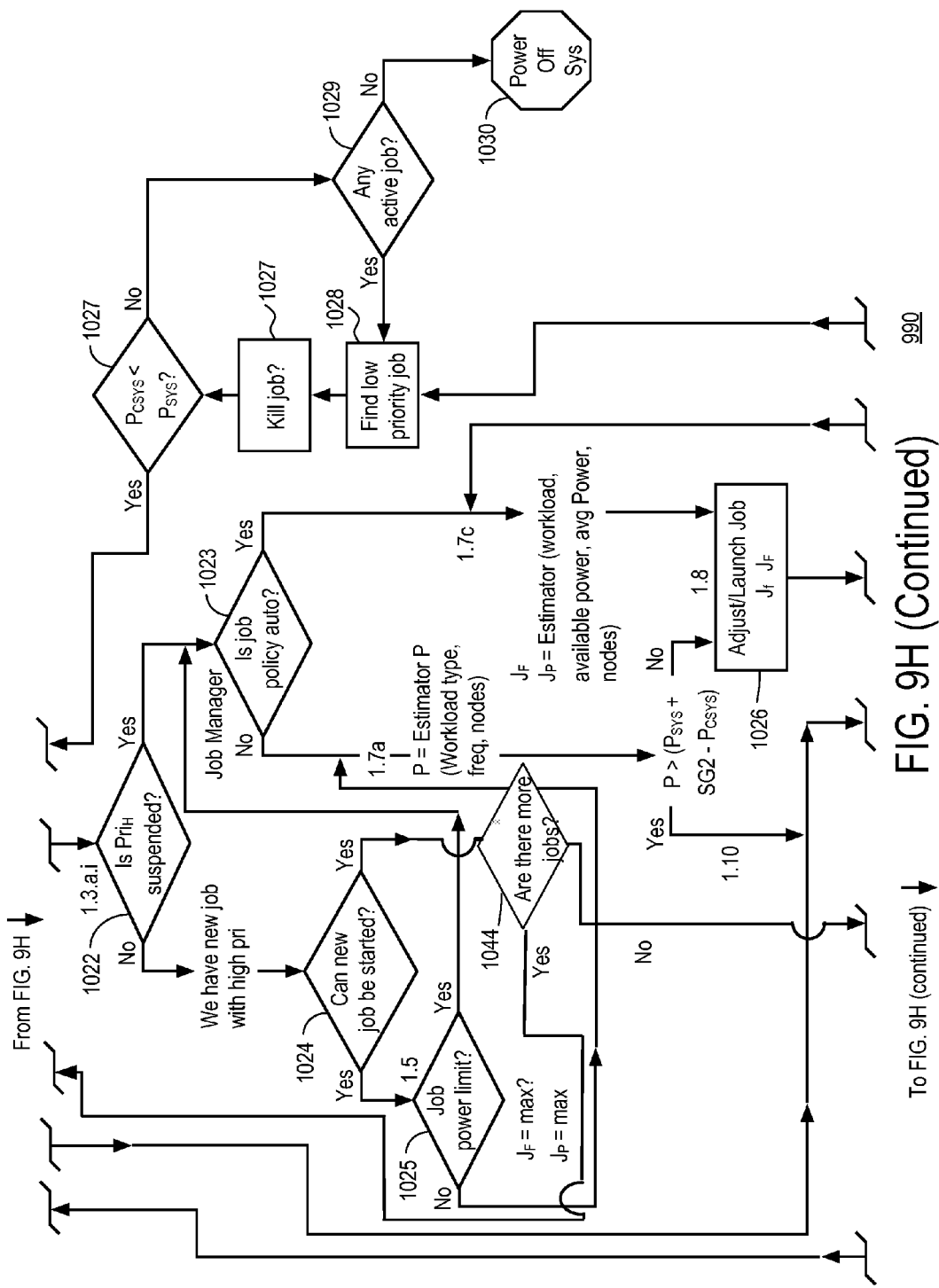
Figure 9H:
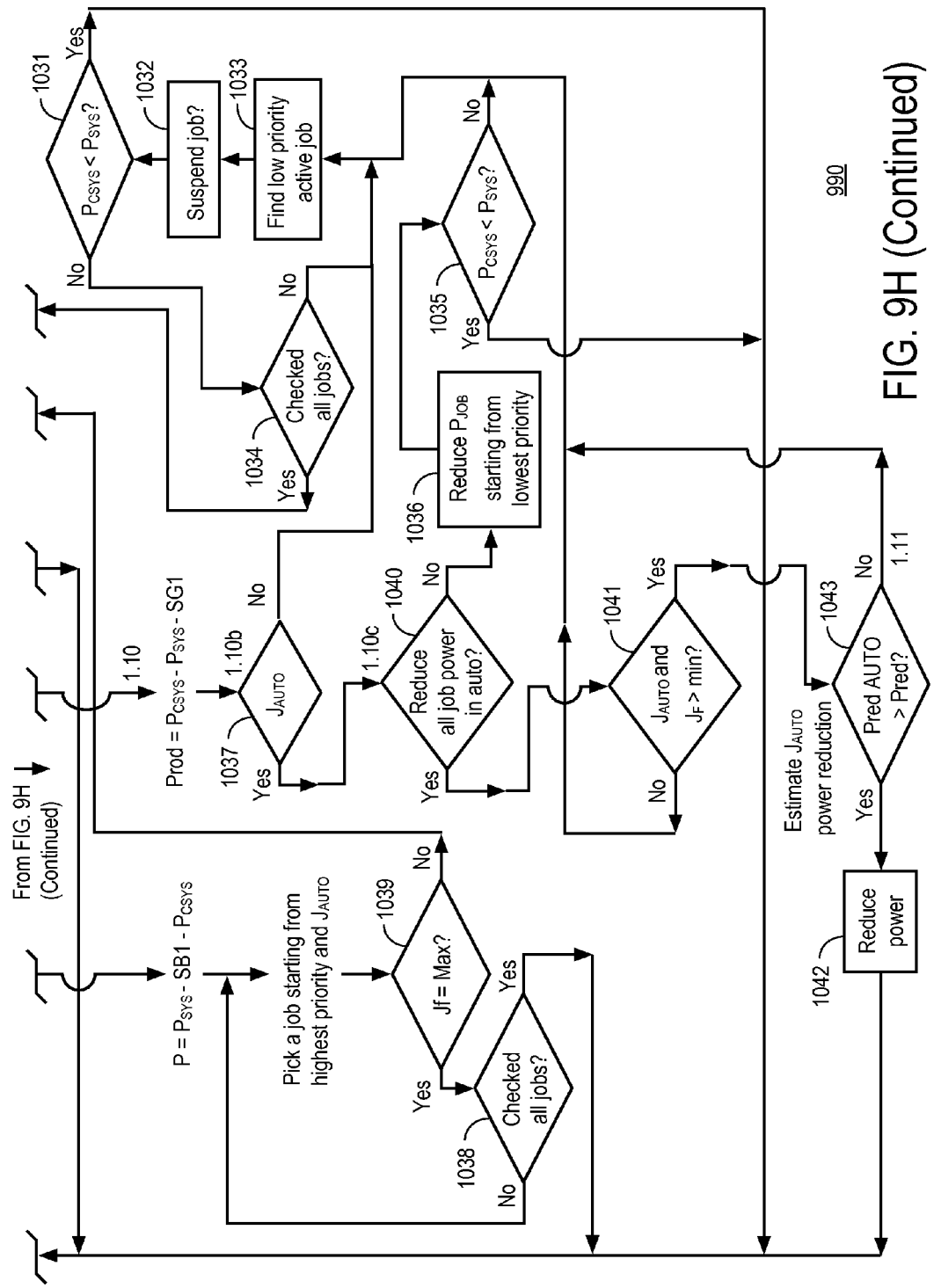

FIG. 9H is a flowchart of a method 990 to provide a power aware job scheduler and job managers according to one embodiment. Some operations of the method 990 are referenced to the items of operations of the power aware scheduler work flow described above. At operation 991 one or more inputs from a user are received. At operation 992 it is determined if Pcsys is greater than a difference between the Psys and a lower system guard band (SysGuardband1) and lower than a sum of Psys and an upper system guard band (SysGuardband2) (Power aware scheduler, item 1.1.) If the Psys−SysGuardband1<Pcsys<Psys+SysGuardband2, at operation 993 it is determined if there a job in a queue. If there is no job in the queue, method 990 returns back to operation 991. If Pcsys is not greater than a difference between the Psys and a lower system guard band (SysGuardband1) and is not lower than a sum of Psys and an upper system guard band (SysGuardband2), at operation 994 it is determined if Pcsys is less than Psys (Power aware scheduler, item 1.2).

If at operation 993 is determined that there is a job in a queue, a method to rebalance power to create a power headroom to accommodate more jobs (Power aware scheduler, item 1.13) is performed. This involves determining at operation 995 if is there is a job in an auto mode (Power aware scheduler, item 1.13). If there is no job in the auto mode, method 990 returns back to operation 991. If there is a job in the auto mode, at operation 996 it is determined if an operating frequency of the job is greater than a minimum frequency Fmin (Power aware scheduler, item 1.13b). If the operating frequency of the job is not greater than the minimum frequency, that means there is no opportunity to reduce power for jobs that are running, method 990 returns back to operation 991.

If the operating frequency of the job is greater than the minimum frequency, an amount of required power headroom for a next job (a new job, or a suspended job) is determined (Power aware scheduler, item 1.13c). At operation 998 it is determined if an available power (P headroom) is less than a power reduction for the job in the auto mode (Power aware scheduler, item 1.13c). If the available power (P headroom) is less than the power reduction for the job, at operation 1020 the allocated power for the job (Jauto power) is reduced. At operation 999 the job is launched, and method returns back to operation 991.

If the available power (P headroom) is not less than the power reduction for the job, at operation 997 it is determined if there is at least one of a new job, or a suspended job. If there is no new job or suspended job, method 990 returns back to operation 998 (Power aware scheduler, item 1.13c). If there is at least one of a new job, or a suspended job, method 990 returns back to operation 991.

If at operation 994 it is determined that the Pcsys is not less than Psys, a method to reduce power to jobs (Power aware scheduler, item 1.10) is performed. A power reduction Pred is determined as a difference between Pcsys−Psys−SystemGuardband 1, and at operation 1037 it is determined if there is a job in the auto mode (Power aware scheduler, item 1.10b). If there is no job in the auto mode, there is no opportunity to reduce power to the job, the job is suspended (Power aware scheduler, item 1.11) and method 900 goes to operation 1033 to identify a job to be suspended.

If there is a job in the auto mode, at operation 1040 it is determined if to reduce power to a group of jobs. If the power to be reduced to a group of jobs, a method to reduce power to jobs in auto mode (Power aware scheduler, item 1.14) is performed. At operation 1041 (Power aware scheduler, item 1.14a) it is determined if there is a job running at a frequency greater than Fmin. If there is the job at the frequency greater than Fmin, a possible power reduction for all jobs running in auto mode (Predauto) is determined (Power aware scheduler, item 1.14b).

At operation 1043 it is determined if Predauto is greater than Pred, the power is reduced at operation 1042 method 990 returns back to operation 991. If Predauto is not greater than Pred, method 990 goes to operation 1033. If there are no jobs running at a frequency greater than Fmin, at operation 1033 an active (running) job having a lowest priority is determined. At operation 1033 the job having the lowest priority is suspended. At operation 1031 it is determined if the Pcsys is less than Psys. If yes, method goes back to operation 991. If the Pcsys is not less than Psys, at operation 1034 it is checked if all jobs whose power can be suspended are suspended. If not all jobs that can be suspended are suspended then method returns to operation 1033 to suspend a next job in queue. If all jobs that can be suspended have been suspended then method 990 goes to operation 1028 involving determining the job having a lowest priority to kill a job so that system power consumption Pcsys can be reduced below system allocation Psys.

At operation 1027A the job having the lowest priority is killed, and then method 990 goes to operation 1027 involving determining if Pcsys<Psys. If Pcsys is less than Psys, method 990 goes back to operation 991. If Pcsys is not less than Psys, at operation 1029 it is determined if there is any active job. If there is an active job, method 990 goes back to operation 1028. If there is no any active job, the system is powered off at operation 1030.

If at operation 1040 it is determined to not to reduce power to all jobs, at operation 1036, the power is reduced to the job having the lowest priority. At operation 1035 it is determined if Pcsys<Psys. If Pcsys is less than Psys, method 990 returns back to operation 991. If Pcsys is not less than Psys, method 990 goes to operation 1033.

If at operation 994 it is determined that Pcsys is less than Psys, a method to allocate more power to a job is performed (Power aware scheduler, item 1.3) that involves selecting a highest priority job from lists of new jobs and suspended jobs at operation 1021. At operation 1022 it is determined if the highest priority job is a suspended job (Power aware scheduler, item 1.3.a.i). If the job highest priority job is a suspended job, at operation 1023 it is determined if the job's policy is an auto mode (Power aware scheduler, item 1.6). If the job's policy is the auto mode, a frequency estimate and a power estimate for the job are determined (Power aware scheduler, item 1.7c), and at operation 1026 the job is launched (Power aware scheduler, item 1.8), and method 990 goes back to operation 991.

If at operation 1023 it is determined that the job's policy is not the auto mode, a power estimate for the job is determined (workload type, frequency, nodes) (Power aware scheduler, item 1.7a). Then it is determined if the power estimate is greater than Psys+SysGuardBand2−Pcsys (Power aware scheduler, item 1.7b). If the power estimate is greater than Psys+SysGuardBand2−Pcsys, method 990 goes to operation 1037 to perform a method to reduce power to jobs (Power aware scheduler, item 1.10). If the power estimate is not greater than the Psys+SysGuardBand2−Pcsys, method 990 goes to operation 1026 to launch the job (Power aware scheduler, item 1.8).

If at operation 1022 it is determined that the highest priority job is not a suspended job, operation 1024 is performed that involves determining if a new job can be started (Power aware scheduler, item 1.4). If the new job can be started, at operation 1025 it is determined if the job is subjected to a power limit (Power aware scheduler, item 1.5). If the job is subjected to the power limit, method 990 goes to operation 1023. If the new job cannot be started, method 900 goes operation 1044. At operation 1044 it is checked if there are any more new jobs, suspended jobs, or both in a queue. If there are, operation 1021 is performed to pick the next job by priority. If there are no more jobs in the queue then from operation 1023 the method goes to operation 1038. An excess power is determined as Psys−System-GuradBand1−Pcsys, and method 990 goes to operation 1038 that involves determining if there is a job. Because there is an excess power yet a new job cannot be started, the excess power is allocated to a job already running on the system. If there is the job, it is determined at operation 1039 if the frequency of a current job is equal to a maximum frequency. If the frequency of the current job is equal to the maximum frequency, method 990 returns to operation 1038 to check for a next job.

If the current job frequency is not equal to the maximum frequency, the current job frequency and allocated power are increased and method 990 goes to operation 1026. If all jobs have been checked at operation 1038, method 990 goes back to operation 991. If at operation 1025 it is determined that the job is not subjected to the power limit, the job profile is set (a PMP, a job frequency, at maximum), and the power for the job is allocated from the estimator (Power aware scheduler, item 1.7a).

Figure 10:
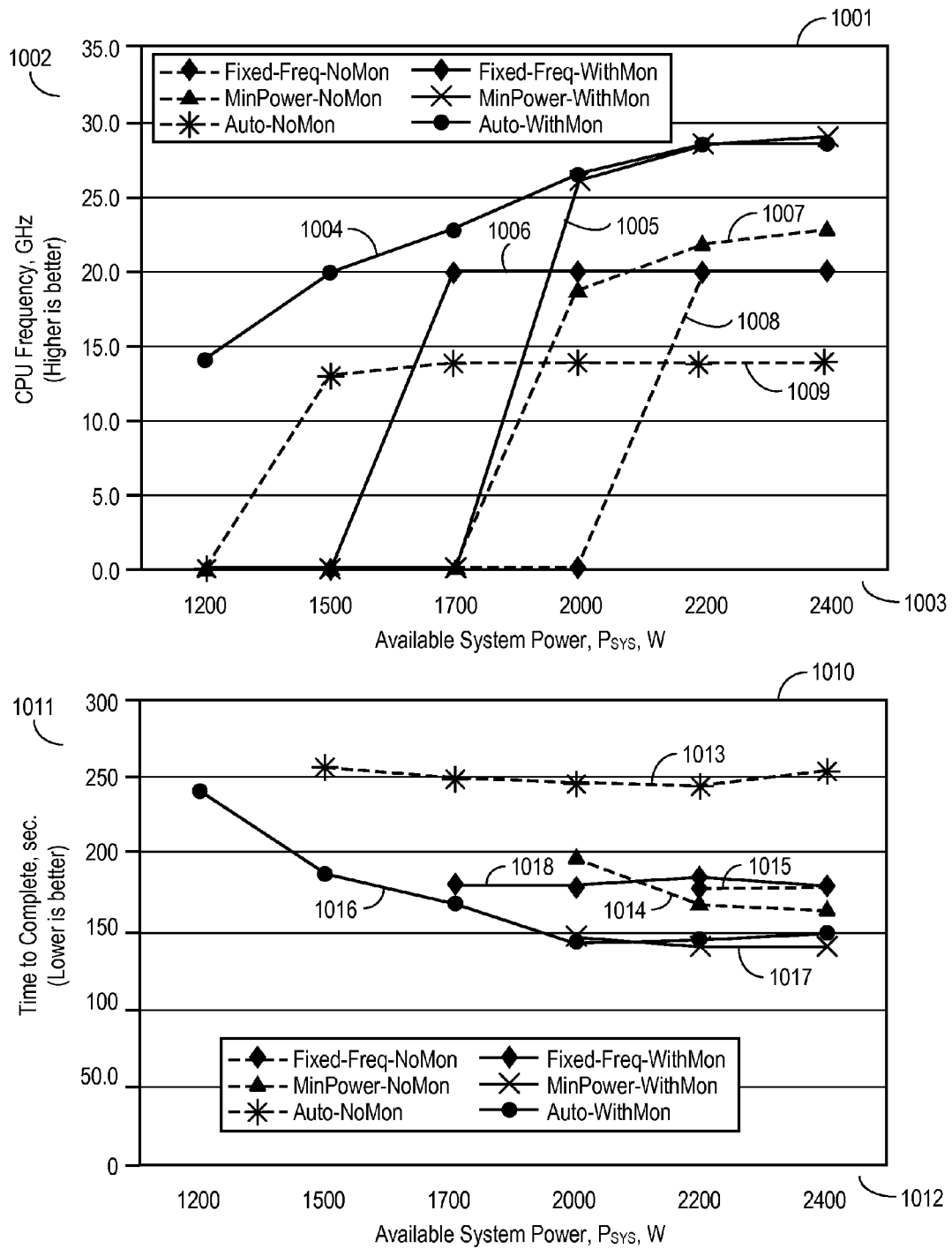
FIG. 10 shows an example of performance of the system with and without power monitoring according to one embodiment.

FIG. 10 shows an example of performance of the system with and without power monitoring according to one embodiment. A fixed frequency mode, a minimal power mode and an auto mode were used to choose uniform frequencies for a job. A graph 1001 shows a CPU frequency 1002 for a job versus an available system power (Psys) 1003 with and without power monitoring. A graph 1010 shows a time to complete a job 1011 versus an available system power (Psys) 1012 with and without power monitoring. Because performance is measured as the wall clock time to complete the job, the lower the number, the better the performance. The solid lines 1004, 1005, and 1006 show the CPU frequency with monitoring and the dotted lines 1007, 1008, and 1009 show the CPU frequency without monitoring. The solid lines 1016, 1017, and 1018 show the time to complete the job with monitoring and the dotted lines 1013, 1014, and 1015 show the time to complete the job without monitoring.

As shown in graphs 1010 and 1001, the resource manager gets better performance with monitoring at all power limits in all modes. The benefit can be up to 40%. The auto mode enables a job to start at the lowest available power compared to the fixed frequency and minimal power modes. An automatic uniform frequency adjustment in auto mode maximizes use of available power. The job in the auto mode can operate at the uniform frequency which is about 40% higher than the frequency in a fixed frequency mode. Additionally, the solid lines in all three cases start closer to the Y-Axis than the corresponding dotted lines. This indicates that monitoring enables the scheduler to start jobs with lower system power limits.

FIG. 11 shows a table 1100 illustrating a mixed mode configuration having jobs running at the same time in different modes according to one embodiment. A column 1102 shows that a job 1 (workload Lulesh (Pr 1)) runs on two nodes with no power limit. A column 1103 shows that a job 2 (workload Qbox (Pr 2)) runs on 2 nodes in a fixed frequency mode. A column 1104 shows that a job 3 (workload MCB (Pr 3)) runs on 4 nodes in a fixed frequency for case 1, a row 1105 and in an auto mode for case 2, a row 1106.

Figure 12:
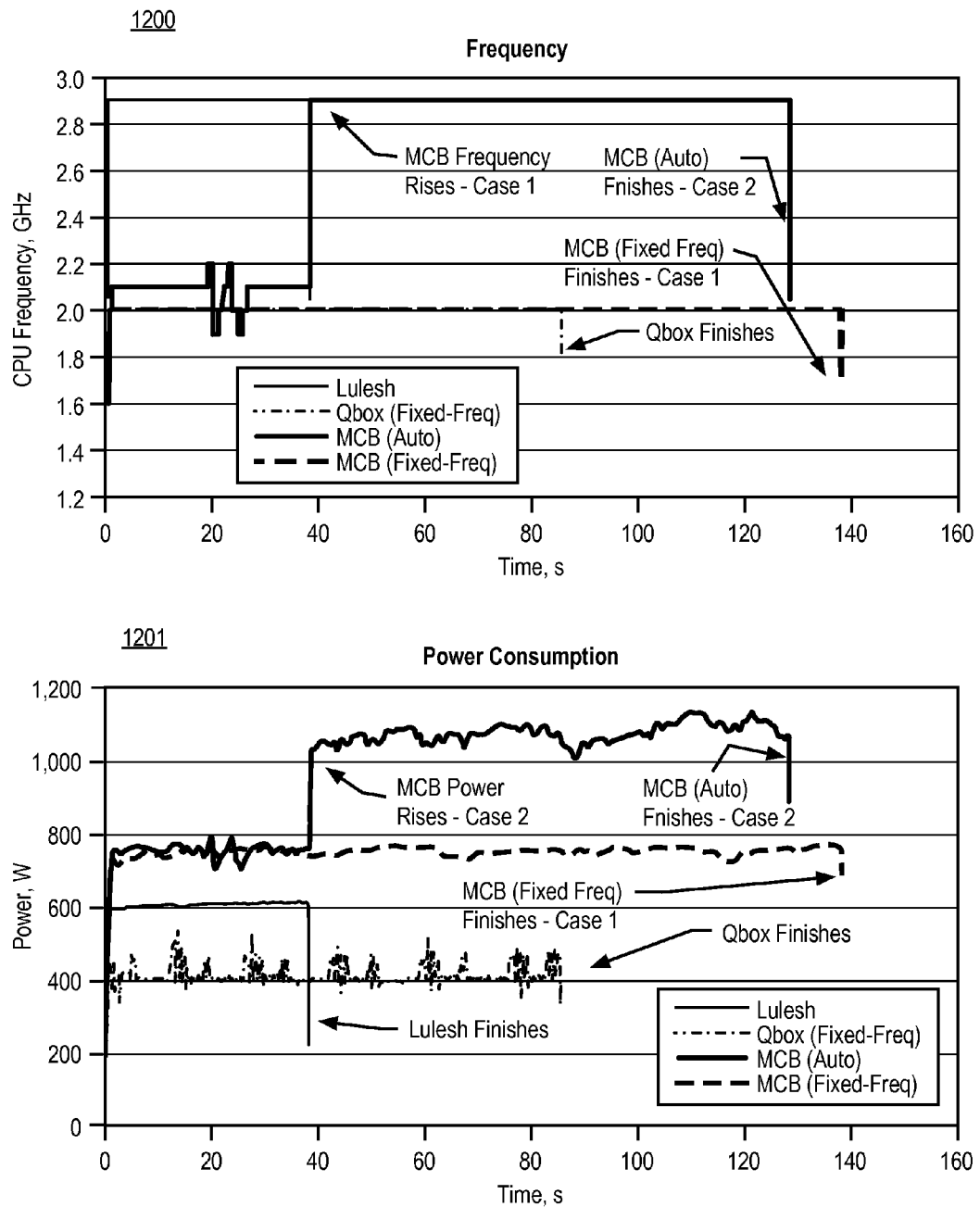
FIG. 12 shows results of the mixed mode configuration shown in FIG. 11 according to one embodiment.
Figure 12:
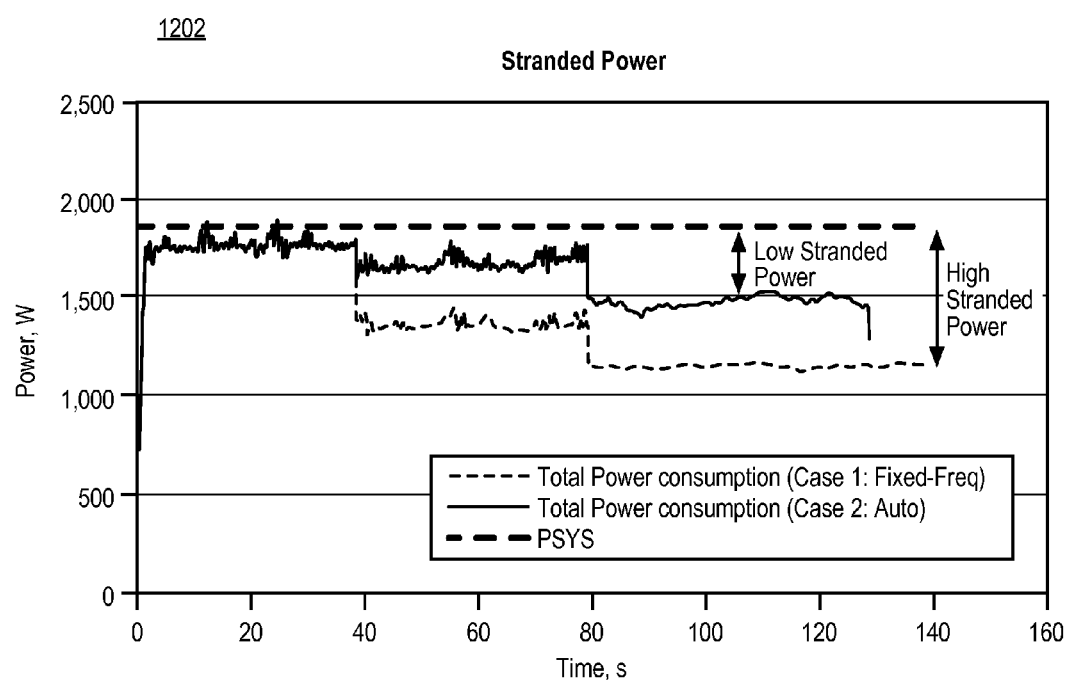

FIG. 12 shows results of the mixed mode configuration shown in FIG. 11 according to one embodiment. Graph 1200 shows a frequency versus time for three jobs for case 1 and case 2. Graph 1201 shows a power consumption versus time for three jobs for case 1 and case 2. Graph 1202 shows a stranded power versus time for three jobs for case 1 and case 2.

As shown in FIGS. 11 and 12 a mixed mode technique provides a flexibility of using different modes at the same time for multiple jobs, while still maximizing the job performance. As shown in FIGS. 11 and 12, job 3 runs in a fixed frequency mode in case 1 and in an auto mode in case 2. In case 2, when job1 completes at 38 seconds, the power freed by job1 provides additional power headroom to allocate power and to increase frequency of job 3 to 2.9 GHz. As a result, job3 finishes sooner in the auto mode than in the fixed frequency mode (case1). The graph 1201 shows that the power consumption over the entire run follows a pattern similar to the CPU frequency. The graph 1202 shows the total power consumption and the resultant stranded power in the case 1 and case 2. As shown in FIG. 12 in case 1, the system does not consume all available power, so that a stranded power is up to 620 W and the job 3 finishes late. In case 2, the system power consumption is steady and is closer to the $P_{SYS}$ value of 1870 W (with a stranded power only about 340 W) causing the job 3 to finish sooner.

FIG. 13 shows a table 1300 illustrating a configuration having two jobs in different modes running at the same time in according to one embodiment. A column 1301 shows that a job 1 runs a workload MCB (Pr1) on 4 nodes with no power limit for both cases 1 and 2. A column 1302 shows that a job 2 runs a workload MCB (Pr1) on 4 nodes in a fixed frequency mode in case 1 (a row 1303) and in an auto mode in case 2 (a row 1304). As shown in table 1300, each of cases 1 and 2 has 2 jobs running simultaneously. The difference between the two cases is that Job 2 rans at a fixed frequency of 2.0 GHz in case 1 and rans in an auto mode in case 2.

Figure 14:
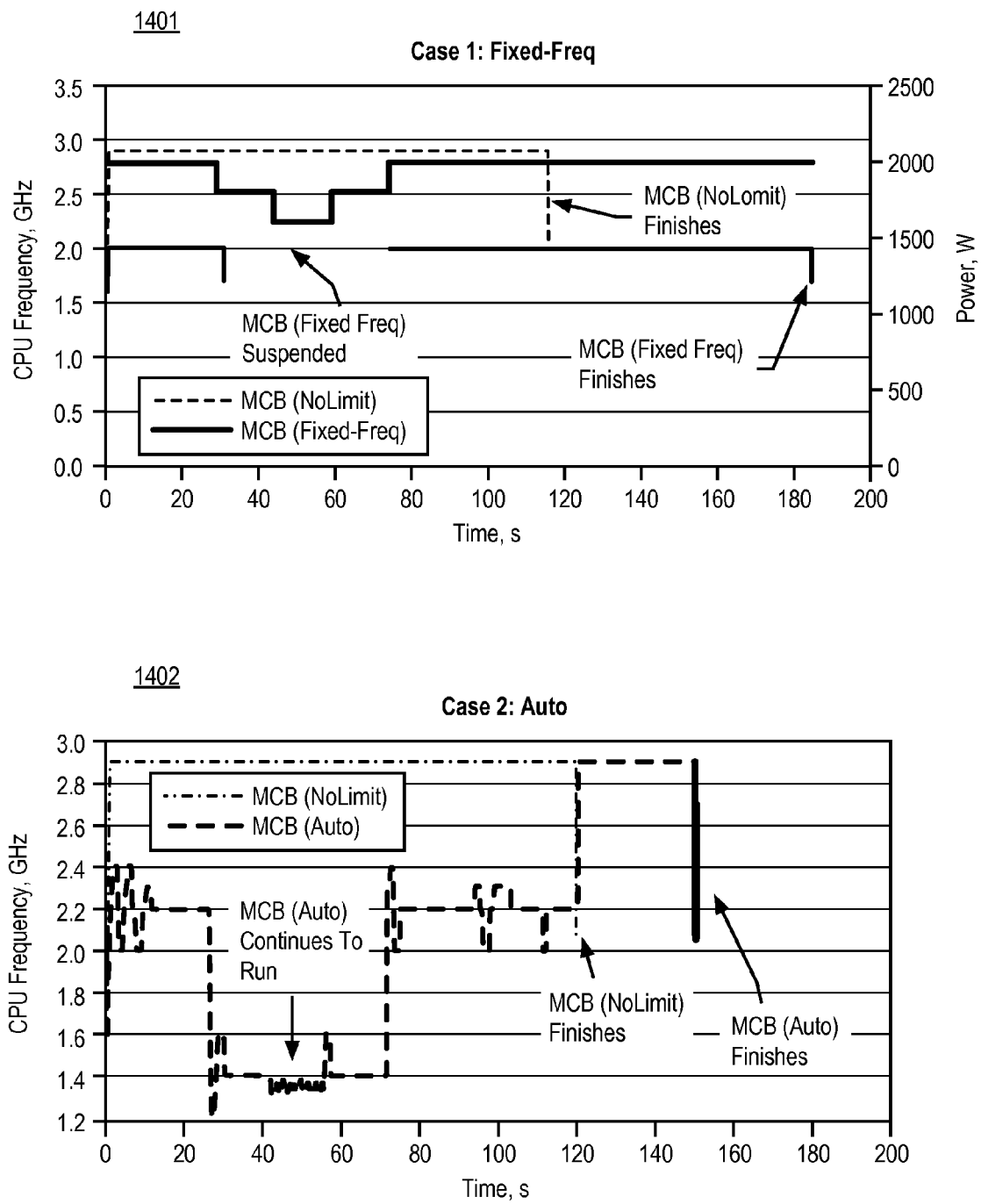
FIG. 14 illustrates effect of time varying system power limit (Psys) on the configuration shown in FIG. 13 according to one embodiment.

FIG. 14 illustrates effect of time varying system power limit (Psys) on the configuration shown in FIG. 13 according to one embodiment. A graph 1401 illustrates a frequency versus time for case 1. A graph 1402 illustrates a frequency versus time for case 2. As shown in FIG. 14, in the auto mode, when Psys changes over time, the power cap and uniform frequency settings for each job are dynamically adjusted. As shown in graphs 1401 and 1402, when Psys reduces, job 2 in case 1 is suspended, while job 2 in case 2 continues to run at a lower frequency and completes sooner than job 2 in case 1.

FIG. 15 shows an effect of time varying $P_{SYS}$ for two cases depicted in FIG. 13 according to one embodiment. A graph 1501 shows a total power consumed, a stranded power and Psys versus time for case 1. A graph 1502 shows a total power consumed, a stranded power and Psys versus time for case 2. As shown in FIG. 15, in case 2, the actual power consumption is closer to the time-varying $P_{SYS}$ and the stranded power stays close to zero. The stranded power occasionally goes negative for short durations. $P_{SYS}$ is the average power maintained over a relatively long duration while the total power is monitored for much smaller duration. $P_{SYS}$ is expected to be maintained over a longer time period and small excursions of the total power above Psys are tolerated so long as the longer time-average stays below the specified system power limit.

Figure 16:
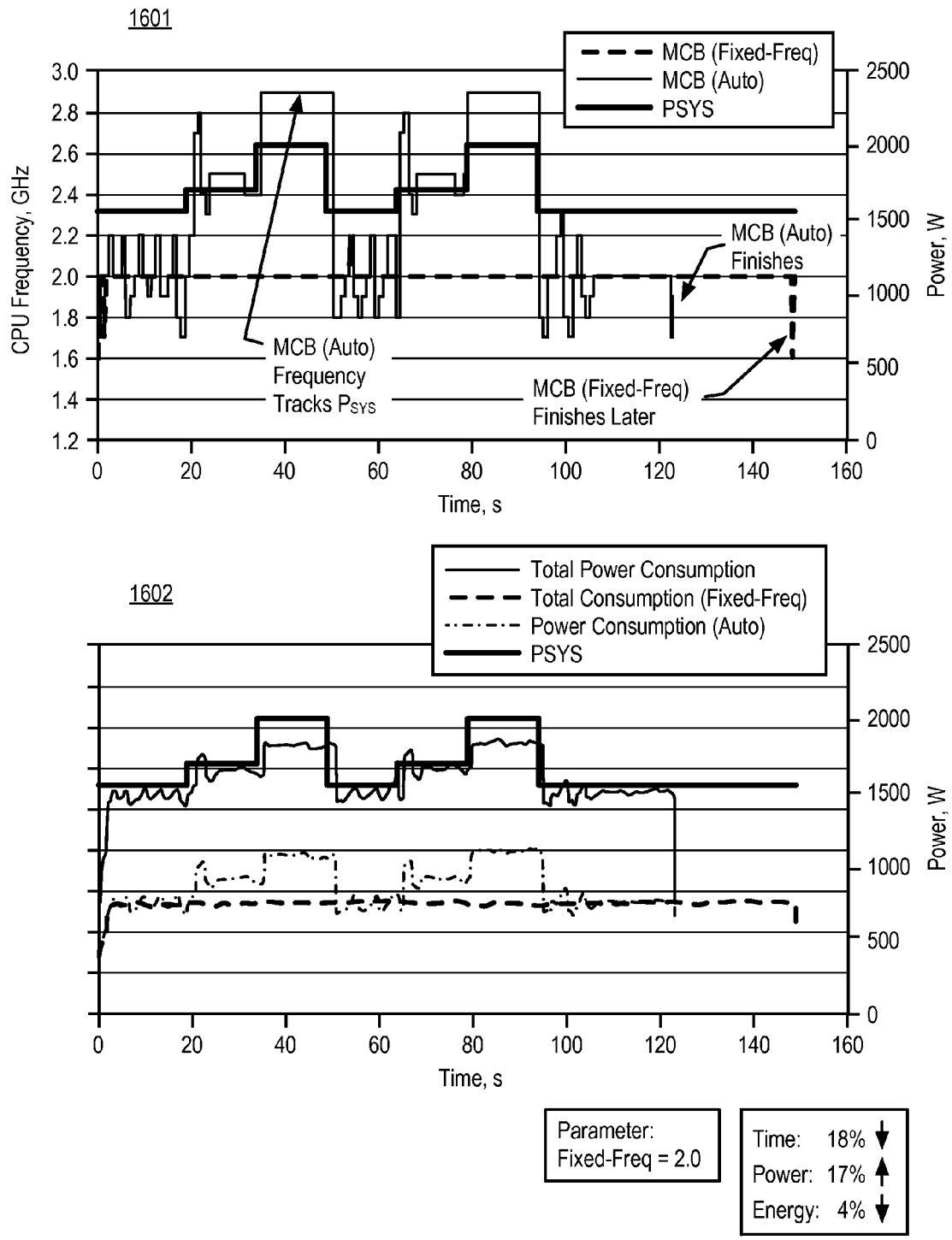
FIG. 16 illustrates adaptability of a job running in an auto mode to varying Psys according to one embodiment.

FIG. 16 illustrates adaptability of a job running in an auto mode to varying Psys according to one embodiment. A graph 1601 shows a CPU frequency for a job in a fixed frequency mode (a curve 1604), a CPU frequency for a job in an auto mode (a curve 1603), and Psys (a curve 1605) versus time and according to one embodiment. As shown in graph 1601, the CPU frequency for a job is increased when Psys increases. As shown in graph 1601, the job in the auto mode completes by about 18% sooner than the job in the fixed frequency mode.

A graph 1602 shows a total power consumption (a curve 1612), a power consumption of a job in a fixed frequency mode (a curve 1611), a power consumption of a job in an auto mode (a curve 1614), and Psys (a curve 1613) versus time according to one embodiment. As shown in graph 1602, the time of completion of the job in the auto mode decreased by about 18% comparing with that of the job in the fixed frequency mode. The power consumption of the job in the auto mode is increased by about 17% comparing with that of the job in the fixed frequency mode. The energy associated with the job in the auto mode is decreased by about 4% comparing with that of the job in the fixed frequency mode.

Figure 17:
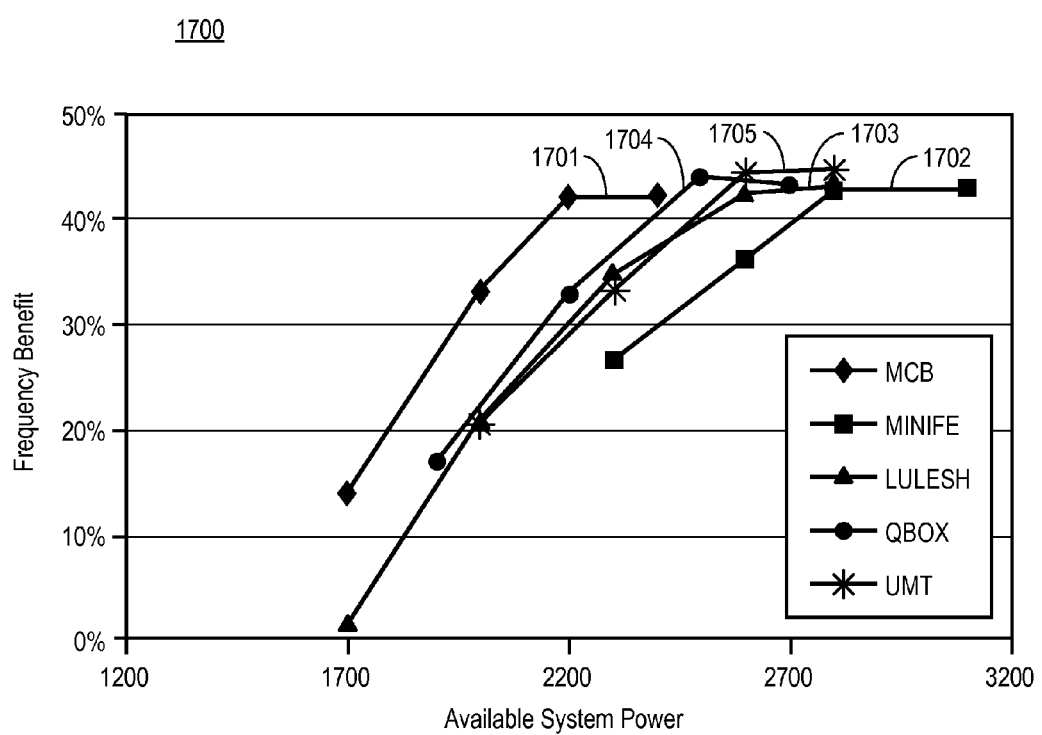
FIG. 17 is a view showing a ratio of frequency for a job in an auto mode to a frequency for the job in a fixed frequency mode for the same workload versus an available system power (Psys) according to one embodiment.

FIG. 17 is a view showing a ratio of frequency for a job in an auto mode to a frequency for the job in a fixed frequency mode for the same workload versus an available system power (Psys) according to one embodiment. Curves 1701, 1702, 1703, 1704 and 1705 correspond to the different jobs having different workloads. The range of $P_{SYS}$ is chosen to be from about 50% to about 100% of the unconstrained workload power. As shown in FIG. 17, the job running in the auto mode results in up to 40% increase in frequency. There are no data points between 1200 W and 1700 W because in that range the jobs can start only in the auto mode. As shown in FIG. 17, the auto mode out performs fixed-frequency mode for all workloads.

Figure 18:
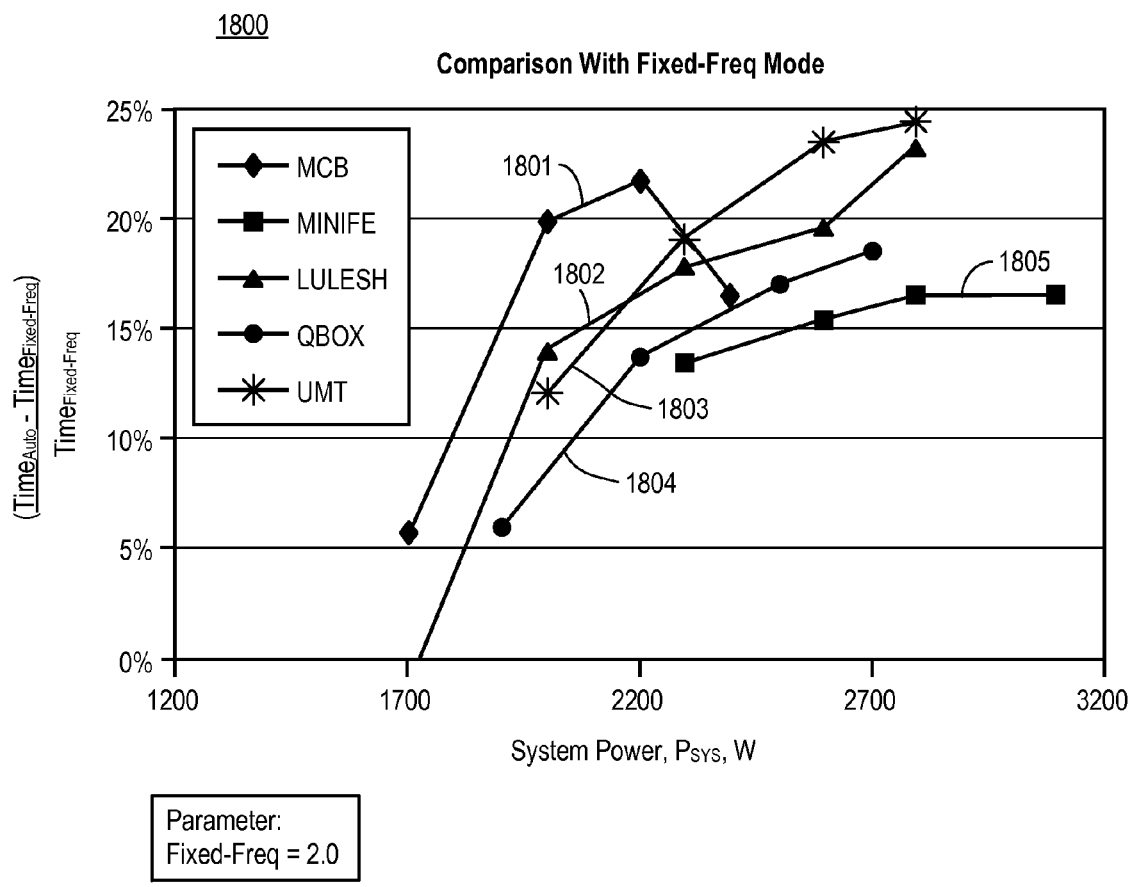
FIG. 18 is a graph showing a percentage increase in time to complete for a job in an auto mode relative to the job in a fixed frequency mode according to one embodiment.

FIG. 18 is a graph 1800 showing a percentage increase in time to complete for a job in an auto mode relative to the job in a fixed frequency mode according to one embodiment. Curves 1801, 1802, 1803, 1804 and 1805 correspond to different jobs having different workloads. As shown in FIG. 18, all workloads complete sooner in the auto mode than in the fixed frequency mode.

Figure 19:
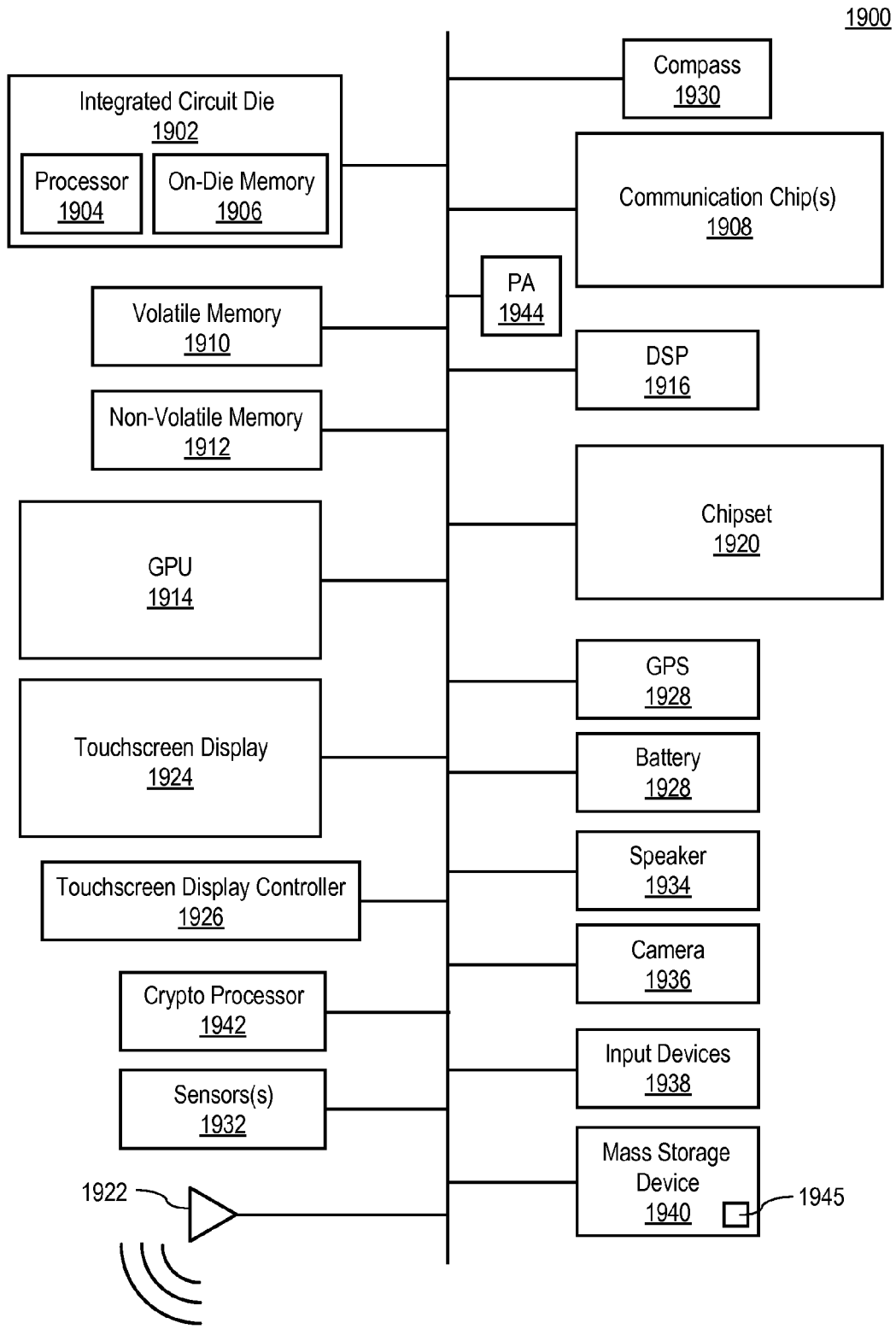
FIG. 19 illustrates a data processing system in accordance with one embodiment.

FIG. 19 illustrates a data processing system 1900 in accordance with one embodiment. Data processing system processing 1900 represents any data processing system to provide a power aware job scheduler and manager, as described herein with respect to FIGS. 1-18. In alternative embodiments, the data processing system 1900 may be connected (e.g., networked) to other machines in a Local Area Network (LAN), an intranet, an extranet, or the Internet. The data processing system 1900 may operate in the capacity of a server or a client machine in a client-server network environment, or as a peer machine in a peer-to-peer (or distributed) network environment.

The data processing system 1900 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein.

A processor 1904 represents one or more general-purpose processing devices such as a microprocessor, central processing unit, or other processing device. More particularly, the processor 1904 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1904 may also be one or more special-purpose processing devices such as an application specific integrated circuit (ASIC), a field programmable gate array (FPGA), a digital signal processor (DSP), network processor, or the like. Processor 1904 is configured to control a processing logic for performing the operations described herein with respect to FIGS. 1-18.

The data processing system 1900 may include a number of components. In one embodiment, these components are attached to one or more motherboards. In an alternate embodiment, these components are fabricated onto a single system-on-a-chip (SoC) die rather than a motherboard. The components in the data processing system 1900 include, but are not limited to, an integrated circuit die 1902 and at least one communication chip 1908. In some implementations the communication chip 1908 is fabricated as part of the integrated circuit die 1902. The integrated circuit die 1902 may include processor 1904, an on-die memory 1906, often used as cache memory, that can be provided by technologies such as embedded DRAM (eDRAM) or spin-transfer torque memory (STTM or STTM-RAM).

Data processing system 1900 may include other components that may or may not be physically and electrically coupled to the motherboard or fabricated within an SoC die. These other components include, but are not limited to, a volatile memory 1910 (e.g., DRAM), a non-volatile memory 1912 (e.g., ROM or flash memory), a graphics processing unit 1914 (GPU), a digital signal processor 1916, a crypto processor 1942 (a specialized processor that executes cryptographic algorithms within hardware), a chipset 1920, an antenna 1922, a display or a touchscreen display 1924, a touchscreen controller 1926, a battery 1928 or other power source, a power amplifier (PA) 1944, a global positioning system (GPS) device 1928, a compass 1930, one or more sensors 1932 (that may include a power sensor to measure the power consumed by a node, power consumed by the system, or both; a motion sensor, or other sensor), a speaker 1934, a camera 1936, user input devices 1938 (such as a keyboard, mouse, stylus, and touchpad), and a mass storage device 1940 (such as hard disk drive, compact disk (CD), digital versatile disk (DVD), and so forth).

The communications chip 1908 enables wireless communications for the transfer of data to and from the data processing system 1900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1908 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 1900 may include a plurality of communication chips 1908. For instance, a first communication chip 1908 may be dedicated to shorter range wireless communications such as Wi-Fi and Bluetooth and a second communication chip 1908 may be dedicated to longer range wireless communications such as GPS, EDGE, GPRS, CDMA, WiMAX, LTE, Ev-DO, and others.

The term "processor" may refer to any device or portion of a device that processes electronic data from registers and/or memory to transform that electronic data into other electronic data that may be stored in registers and/or memory.

In various embodiments, the data processing system 1900 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the data processing system 1900 may be any other electronic device that processes data.

The mass storage device 1940 may include a machine-accessible storage medium (or more specifically a computer-readable storage medium) 1945 on which is stored one or more sets of instructions (e.g., a software) embodying any one or more of the methodologies or functions described herein. The software may also reside, completely or at least partially, within the memory 1910, memory 1912, memory 1906 and/or within the processor 1904 during execution thereof by the data processing system 1900, the on-die memory 1906 and the processor 1904 also constituting machine-readable storage media. The software may further be transmitted or received over a network via a network interface device.

While the machine-accessible storage medium 1944 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The following examples pertain to further embodiments:

A method to operate a data processing system, comprising receiving an indication of a mode for a job, determining an available power for the job based on the mode, and allocating a first power for the job based on the available power.

A method to operate a data processing system, comprising receiving an indication of a mode for a job, determining an available power for the job based on the mode, and determining a first frequency for the job based on the available power, and allocating a first power for the job based on the first frequency.

A method to operate a data processing system, comprising receiving an indication of a mode for a job, determining an available power for the job based on the mode, allocating a first power for the job based on the available power, and adjusting the first power.

A method to operate a data processing system, comprising receiving an indication of a mode for a job, determining an available power for the job based on the mode, determining an amount of required power for the job, and allocating a first power for the job based on at least one of the available power and the required power.

A method to operate a data processing system, comprising receiving an indication of a mode for a job, determining an available power for the job based on the mode, and allocating a first power for the job based on the available power, wherein the available power is determined based on at least one of a monitored power, an estimated power, and a calibrated power.

A method to operate a data processing system, comprising receiving an indication of a mode for a job, determining an available power for the job based on the mode, and allocating a first power for the job based on the available power, wherein the first power is determined based on an average power for the job.

A method to operate a data processing system, comprising receiving an indication of a mode for a job, determining an available power for the job based on the mode, and allocating a first power for the job based on the available power, wherein the mode comprises an indication about whether the job is subjected to a power limit, an indication about a power policy for the job, an indication about a suspension policy for the job, or any combination thereof.

A method to provide a power aware job scheduler and manager, comprising determining an available power for a first job; determining a first frequency for the first job based on the available power; and allocating a first power for the first job based on the first frequency.

A method to provide a power aware job scheduler and manager, comprising determining an available power for a first job; determining a first frequency for the first job based on the available power; and allocating a first power for the first job based on the first frequency, wherein the first frequency is used on a plurality of nodes that run the first job.

A method to provide a power aware job scheduler and manager, comprising determining an available power for a first job; determining a first frequency for the first job based on the available power; and allocating a first power for the first job based on the first frequency; monitoring one or more second jobs; and adjusting the first power based on the monitoring.

A method to provide a power aware job scheduler and manager, comprising receiving an indication of a mode for the first job; determining an available power for the first job based on the mode; determining a first frequency for the first job based on the available power; and allocating a first power for the first job based on the first frequency.

A method to provide a power aware job scheduler and manager, comprising determining an available power for a first job; determining a first frequency for the first job based on the available power; and allocating a first power for the first job based on the first frequency; decreasing the first frequency, if the allocated power is greater than a first threshold; and increasing the first frequency, if the allocated power is less than a second threshold.

A non-transitory machine readable medium comprising instructions that cause a data processing system to perform operations comprising receiving an indication of a mode for a job, determining an available power for the job based on the mode, and allocating a first power for the job based on the available power.

A non-transitory machine readable medium comprising instructions that cause a data processing system to perform operations comprising receiving an indication of a mode for a job, determining an available power for the job based on the mode, determining a first frequency for the job based on the available power, and allocating a first power for the job based on the first frequency.

A non-transitory machine readable medium comprising instructions that cause a data processing system to perform operations comprising receiving an indication of a mode for a job, determining an available power for the job based on the mode, allocating a first power for the job based on the available power, and adjusting the first power.

A non-transitory machine readable medium comprising instructions that cause a data processing system to perform operations comprising receiving an indication of a mode for a job, determining an available power for the job based on the mode, determining an amount of required power for the job, and allocating a first power for the job based on at least one of the available power and the required power.

A non-transitory machine readable medium comprising instructions that cause a data processing system to perform operations comprising receiving an indication of a mode for a job, determining an available power for the job based on the mode, and allocating a first power for the job based on the available power, wherein the available power is determined based on at least one of a monitored power, an estimated power, and a calibrated power.

A non-transitory machine readable medium comprising instructions that cause a data processing system to perform operations comprising receiving an indication of a mode for a job, determining an available power for the job based on the mode, and allocating a first power for the job based on the available power, wherein the first power is determined based on an average power for the job.

A non-transitory machine readable medium comprising instructions that cause a data processing system to perform operations comprising receiving an indication of a mode for a job, determining an available power for the job based on the mode, and allocating a first power for the job based on the available power, wherein the mode comprises an indication about whether the job is subjected to a power limit, an indication about a power policy for the job, an indication about a suspension policy for the job, or any combination thereof.

A non-transitory machine readable medium comprising instructions that cause a data processing system to perform operations comprising determining an available power for a first job; determining a first frequency for the first job based on the available power; and allocating a first power for the first job based on the first frequency.

A non-transitory machine readable medium comprising instructions that cause a data processing system to perform operations comprising determining an available power for a first job; determining a first frequency for the first job based on the available power; and allocating a first power for the first job based on the first frequency, wherein the first frequency is used on a plurality of nodes that run the first job.

A non-transitory machine readable medium comprising instructions that cause a data processing system to perform operations comprising determining an available power for a first job, determining a first frequency for the first job based on the available power, allocating a first power for the first job based on the first frequency, monitoring one or more second jobs, and adjusting the first power based on the monitoring.

A non-transitory machine readable medium comprising instructions that cause a data processing system to perform operations comprising receiving an indication of a mode for the first job, determining an available power for the first job based on the mode, determining a first frequency for the first job based on the available power, and allocating a first power for the first job based on the first frequency.

A non-transitory machine readable medium comprising instructions that cause a data processing system to perform operations comprising determining an available power for a first job; determining a first frequency for the first job based on the available power, allocating a first power for the first job based on the first frequency, decreasing the first frequency, if the allocated power is greater than a first threshold, and increasing the first frequency, if the allocated power is less than a second threshold.

A data processing system comprising a memory, and a processor coupled to the memory, wherein the processor is configured to receive an indication of a mode for a job, to determine an available power for the job based on the mode; and to allocate a first power for the job based on the available power.

A data processing system comprising a memory, and a processor coupled to the memory, wherein the processor is to receive an indication of a mode for a job, to determine an available power for the job based on the mode; to determine a first frequency for the job based on the available power, and to allocate a first power for the job based on the first frequency.

A data processing system comprising a memory, and a processor coupled to the memory, wherein the processor is to receive an indication of a mode for a job, to determine an available power for the job based on the mode, to allocate a first power for the job based on the available power, and to adjust the first power.

A data processing system comprising a memory, and a processor coupled to the memory, wherein the processor is to receive an indication of a mode for a job, to determine an available power for the job based on the mode, to determine an amount of required power for the job, and to allocate a first power for the job on at least one of the available power and the required power.

A data processing system comprising a memory, and a processor coupled to the memory, wherein the processor is to receive an indication of a mode for a job, to determine an available power for the job based on the mode, to allocate a first power for the job based on the available power, wherein the available power is determined based on at least one of a monitored power, an estimated power, and a calibrated power.

A data processing system comprising a memory, and a processor coupled to the memory, wherein the processor is to receive an indication of a mode for a job, to determine an available power for the job based on the mode, to allocate a first power for the job based on the available power, wherein the first power is determined based on an average power for the job.

A data processing system comprising a memory, and a processor coupled to the memory, wherein the processor is to receive an indication of a mode for a job, to determine an available power for the job based on the mode, to allocate a first power for the job based on the available power, wherein the mode comprises an indication about whether the job is subjected to a power limit, an indication about a power policy for the job, an indication about a suspension policy for the job, or any combination thereof.

A data processing system comprising a memory, and a processor coupled to the memory, wherein the processor is to determine an available power for a first job, to determine a first frequency for the first job based on the available power; and to allocate a first power for the first job based on the first frequency.

A data processing system comprising a memory, and a processor coupled to the memory, wherein the processor is to determine an available power for a first job; to determine a first frequency for the first job based on the available power; and to allocate a first power for the first job based on the first frequency, wherein the first frequency is used on a plurality of nodes that run the first job.

A data processing system comprising a memory, and a processor coupled to the memory, wherein the processor is to determine an available power for a first job; to determine a first frequency for the first job based on the available power; to allocate a first power for the first job based on the first frequency, to monitor one or more second jobs, and to adjust the first power based on the monitoring.

A data processing system comprising a memory, and a processor coupled to the memory, wherein the processor is to receive an indication of a mode for the first job, to determine an available power for the first job based on the mode, to determine a first frequency for the first job based on the available power, and to allocate a first power for the first job based on the first frequency.

A data processing system comprising a memory, and a processor coupled to the memory, wherein the processor is to determine an available power for a first job, to determine a first frequency for the first job based on the available power, to allocate a first power for the first job based on the first frequency, to decrease the first frequency, if the allocated power is greater than a first threshold; and to increase the first frequency, if the allocated power is less than a second threshold.

A method to manage a power for a data processing system, comprising determining a power allocated to a system; determining a power consumed by the system; identifying a job; and allocating the power to the identified job based at least on the power consumed by the system.

A method to manage a power for a data processing system, comprising determining a power allocated to a system; determining a power consumed by the system; identifying a job, if the power consumed by the system is less than the power allocated to the system, and allocating the power to the identified job based at least on the power consumed by the system.

A method to manage a power for a data processing system, comprising determining a power allocated to a system; determining a power consumed by the system; identifying a job, wherein the identifying the job comprises determining a priority for the job relative to one or more other jobs, and selecting the job based on the priority; and allocating the power to the job based at least on the power consumed by the system.

A method to manage a power for a data processing system, comprising determining a power allocated to a system; determining a power consumed by the system; identifying a job, if the power consumed by the system is greater than the power allocated to the system; and reducing the power allocated to the identified job.

A method to manage a power for a data processing system, comprising determining a power allocated to a system; determining a power consumed by the system; identifying a job; determining a mode of the identified job; and allocating the power to the identified job based at least on the power consumed by the system and the mode.

A method to manage a power for a data processing system comprising determining an excess power for a system; determining a current power consumed by a job, and allocating an additional power for the job based on at least one of the excess power and current power.

A method to manage a power for a data processing system comprising determining an excess power for a system; identifying a job having a highest priority relative to other running jobs, determining a current power consumed by the identified job, allocating an additional power for the identified job based on at least one of the excess power and current power.

A method to manage a power for a data processing system comprising determining an excess power for a system; determining a current power consumed by a job; determining a current frequency for the job, allocating an additional power for the job based on at least one of the excess power and current power; and increasing the current frequency.

A method to manage a power for a data processing system comprising determining an excess power for a system, wherein the excess power is determined as a difference between a power allocated to a system, a power consumed by the system, and a power guardband; determining a current power consumed by a job, and allocating an additional power for the job based on at least one of the excess power and current power.

A method to manage a power for a data processing system comprising determining an excess power for a system; determining a current power consumed by a first job, and allocating an additional power for the first job based on at least one of the excess power and current power, and allocating an additional power for a second job.

A method to manage a power for a data processing system comprising determining a power reduction for a system; and reducing a power allocation for a job based on the power reduction for the system.

A method to manage a power for a data processing system comprising determining a power reduction for a system; determining a mode of a job; and reducing a power allocation for the job based on the power reduction for the system and on the mode.

A method to manage a power for a data processing system comprising determining a power reduction for a system; identifying a job having a lowest priority relative to other jobs, and reducing a power allocation for the identified job based on the power reduction for the system.

A method to manage a power for a data processing system comprising determining a power reduction for a system; determining an operating frequency for a job, and reducing a power allocation for the job based on the operating frequency.

A method to manage a power for a data processing system comprising determining a power reduction for a system; determining a number of nodes running a job; and reducing a power allocation for the job based on the number of nodes.

A method to manage a power for a data processing system comprising monitoring one or more first jobs, determining a power estimate for a second job; and reducing a power allocation for one or more first jobs based on the power estimate to accommodate the second job.

A method to manage a power for a data processing system comprising monitoring one or more first jobs, determining a power estimate for a second job; identifying a priority of the one or more first jobs, reducing a power allocation for the one or more first jobs based on the priority and the power estimate to accommodate the second job.

A method to manage a power for a data processing system comprising monitoring one or more first jobs, determining an operating frequency of the one or more first jobs; determining a power estimate for a second job; and reducing a power allocation for the one or more first jobs based on the operating frequency and the power estimate to accommodate the second job.

A method to manage a power for a data processing system comprising monitoring one or more first jobs, determining a power estimate for a second job; determining an available power for a system; and reducing a power allocation for one or more first jobs based on the power estimate and the available power to accommodate the second job.

A method to manage a power for a data processing system comprising monitoring one or more first jobs, determining a power estimate for a second job; and reducing a power allocation for one or more first jobs based on the power estimate to accommodate the second job, wherein the second job is one of a new job and a suspended job.

A method to manage a power for a data processing system comprising determining an operational frequency of a job; determining a power reduction for the job; and reducing an allocated power for the job based on the power reduction.

A method to manage a power for a data processing system comprising determining an operational frequency of a job; determining a power reduction for the job, if a difference between a consumed system power and an allocated system power is less than a predetermined threshold; and reducing an allocated power for the job based on the power reduction.

A method to manage a power for a data processing system comprising determining an operational frequency of a job; determining a power reduction for the job, if the operational frequency is greater than a minimum frequency; and reducing an allocated power for the job based on the power reduction.

A method to manage a power for a data processing system comprising determining an operational frequency of a first job; determining a power reduction for the first job; determining a power reduction for a second job, and reducing an allocated power for at least one of the first job and the second job based on the power reduction.

A method to manage a power for a data processing system comprising determining an operational frequency of a job; determining a power reduction for the job, wherein the power reduction is determined based at least on a power consumed by a system, a power allocated to the system and a system guardband; and reducing an allocated power for the job based on the power reduction.

In the foregoing specification, methods and apparatuses have been described with reference to specific exemplary embodiments thereof. It will be evident that various modifications may be made thereto without departing from the broader spirit and scope of embodiments as set forth in the following claims. The specification and drawings are, accordingly, to be regarded in an illustrative sense rather than a restrictive sense.

What is claimed is:

1. A method to operate a data processing system comprising a plurality of nodes, comprising:
    receiving an indication of a mode for a first job;
    determining an available power for the first job based on the mode;
    adjusting a first frequency of the plurality of nodes that run the first job based on the available power, wherein the first frequency is common to the plurality of nodes running the first job;
    allocating a first power for the first job that runs on the plurality of nodes based on the first frequency;
    determining if the first frequency is greater than a predetermined frequency, and
    determining an available power for a second job, if the first frequency is greater than a predetermined frequency.

2. The method of claim 1, further comprising
    adjusting the first power when the available power changes.

3. The method of claim 1, further comprising
determining an amount of required power for the first job.

4. The method of claim 1, wherein the available power is determined based on at least one of a monitored power, an estimated power, and a calibrated power.

5. The method of claim 1, wherein the first power is allocated based on an average power for the first job.

6. The method of claim 1, wherein the mode comprises an indication about whether the first job is subjected to a power limit, an indication about a power policy for the first job, an indication about a suspension policy for the first job, or any combination thereof.

7. A method to provide a power aware job scheduler and manager for a data processing system comprising a plurality of nodes, comprising
determining an available power for a first job;
adjusting a first frequency of the plurality of nodes that run the first job based on the available power, wherein the first frequency is common to the plurality of nodes running the first job;
allocating a first power for the first job that runs on the plurality of nodes based on the first frequency;
determining if the first frequency is greater than a predetermined frequency, and
determining an available power for a second job, if the first frequency is greater than a predetermined frequency.

8. The method of claim 7, further comprising
monitoring one or more second jobs; and
adjusting the first power based on the monitoring.

9. The method of claim 7, further comprising
receiving an indication of a mode for the first job, wherein the available power is determined based on the mode.

10. The method of claim 7, further comprising
decreasing the first frequency, if the allocated power is greater than a first threshold; and
increasing the first frequency, if the allocated power is less than a second threshold.

11. A non-transitory machine readable medium comprising instructions that cause a data processing system comprising a plurality of nodes to perform operations comprising:
receiving an indication of a mode for a first job;
determining an available power for the first job based on the mode;
adjusting a first frequency of the plurality of nodes that run the first job based on
the available power, wherein the first frequency is common to the plurality of
nodes running the first job; and
allocating a first power for the first job that runs on the plurality of nodes based on the first frequency;
determining if the first frequency is greater than a predetermined frequency, and determining an available power for a second job, if the first frequency is greater than a predetermined frequency.

12. The non-transitory machine readable medium of claim 11, further comprising instructions that cause the data processing system to perform operations comprising
adjusting the first power.

13. The non-transitory machine readable medium of claim 11, further comprising instructions that cause the data processing system to perform operations comprising
determining an amount of required power for the first job.

14. The non-transitory machine readable medium of claim 11, wherein the available power is determined based on at least one of a monitored power, an estimated power, and a calibrated power.

15. The non-transitory machine readable medium of claim 11, wherein the first power is determined based on an average power for the first job.

16. The non-transitory machine readable medium of claim 11, wherein the mode comprises an indication about whether the first job is subjected to a power limit, an indication about a power policy for the first job, an indication about a suspension policy for the first job, or any combination thereof.

17. A data processing system, comprising:
a plurality of nodes;
a memory coupled to the plurality of the nodes; and a processor coupled to the memory, wherein the processor is to receive an indication of a mode for a first job, to determine an available power for the first job based on the mode; to adjust a first frequency of the plurality of nodes that run the first job based on the available power, wherein the first frequency is common to the plurality of nodes running the first job; and to allocate a first power for the first job that runs on the plurality of nodes based on the first frequency, and wherein the processor is to determine if the first frequency is greater than a predetermined frequency, and to determine an available power for a second job, if the first frequency is greater than a predetermined frequency.

18. The data processing system of claim 17, wherein the processor is further to adjust the first power.

19. The data processing system of claim 17, wherein the processor is further to determine an amount of required power for the first job.

20. The data processing system of claim 17, wherein the available power is determined based on at least one of a monitored power, an estimated power, and a calibrated power.

21. The data processing system of claim 17, wherein the mode comprises an indication about whether the first job is subjected to a power limit, an indication about a power policy for the first job, an indication about a suspension policy for the first job, or any combination thereof.

* * * * *